United States Patent [19]

Adair et al.

[11] Patent Number: 5,257,366
[45] Date of Patent: Oct. 26, 1993

[54] QUERY LANGUAGE EXECUTION ON HETEROGENEOUS DATABASE SERVERS USING A BIND-FILE BRIDGE BETWEEN APPLICATION AND DATEBASE LANGUAGES

[75] Inventors: John G. Adair, Austin, Tex.; Richard A. Demers, Rochester, Minn.; Dusan Ecimovic, Orinda, Calif.; Robert J. Grafe, Austin, Tex.; Robert D. Jackson; Bruce G. Lindsay, both of San Jose, Calif.; Michael E. Murphy, Durham, N.C.; Roger A. Reinsch, Cupertino, Calif.; Robert P. Resch, Byron; Richard R. Sanders, Rochester, both of Minn.; Patricia G. Selinger, San Jose, Calif.; Robert L. Sunday, Sharon, Canada; Melvin R. Zimowski, San Jose, Calif.

[73] Assignee: International Business Machines Corporation, Armonk, N.Y.

[21] Appl. No.: 500,032

[22] Filed: Mar. 27, 1990

[51] Int. Cl.⁵ .......................... G03F 9/44; G03F 15/20
[52] U.S. Cl. ..................................... 395/600; 395/700; 395/200; 395/153; 364/DIG. 1; 364/231.6; 364/281.3; 364/282.4; 364/284.3; 364/286; 364/280.4; 364/261
[58] Field of Search ............... 395/600, 200, 153, 700; 364/200, 900

[56] References Cited

U.S. PATENT DOCUMENTS

| | | | |
|---|---|---|---|
| 4,205,371 | 5/1980 | Feather | 364/200 |
| 4,714,989 | 12/1987 | Billings | 364/200 |
| 4,734,856 | 3/1988 | Davis | 364/300 |
| 4,961,133 | 10/1990 | Talati et al. | 364/200 |
| 5,008,853 | 4/1991 | Bly et al. | 364/900 |
| 5,036,484 | 7/1991 | McCoy et al. | 364/900 |
| 5,058,000 | 10/1991 | Cox et al. | 364/200 |
| 5,089,954 | 2/1992 | Rago | 395/600 |
| 5,179,660 | 1/1993 | Devany et al. | 395/200 |

FOREIGN PATENT DOCUMENTS 861067163 5/1986 European Pat. Off.
861067171 3/1987 European Pat. Off.

OTHER PUBLICATIONS

McFadden et al., "Data Base Management", 1985, pp. 363-364, Benjamin/Cummings Publishing Co., Menlo Park. Calif.
IBM Technical Disclosure Bulletin, vol. 21, No. 5, Nov. 1978 Access Generator For a Database System, Coleman, Fernandez, Summers.
IBM Technical Disclosure Bulletin, vol. 29, No. 1, Jun. 1986 Directory Service System Model For Query and Update Processing.

*Primary Examiner*—Thomas C. Lee
*Assistant Examiner*—Wayne Amsbury
*Attorney, Agent, or Firm*—Baker, Maxham, Jester & Meador

[57] ABSTRACT

Application programs which are developed and scheduled within a first computing system environment are permitted to access relational data registered at a remote database management system (DBMS) operating in a second computing environment dissimilar to the first computing environment. Access to data through the DBMS from an application execution site remote from the DBMS is supported by a process, logically subordinate to the application program which maps application program data access requests to the DBMS.

13 Claims, 14 Drawing Sheets

```
100  PREPROCESSOR( APPLICATIONPROGRAMFILE, PACKAGE,
101                MODIFIEDPROGRAMFILE,
102                BINDFILE )
103    UNTIL ( END OF APPLICATIONPROGRAMFILE )
104      UNTIL ( DATABASE COMMAND RECOGNIZED )
105        COPY APPLICATIONPROGRAMFILE TO MODIFIEDPROGRAMFILE
106      CLASSIFYDATABASECOMMAND ( RECOGNIZEDDATABASECOMMAND,
107                                COMMANDCLASS )
108      REPLACEDATABASECOMMAND ( RECOGNIZEDDATABASECOMMAND,
109                               COMMANDCLASS, PACKAGE, TAG )
110      ADDTOBINDFILE ( RECOGNIZEDDATABASECOMMAND,
111                      COMMANDCLASS, TAG )
```

PREPROCESSOR HIGH LEVEL PSEUDOCODE

FIG. 2

```
200  CLASSIFYDATABASECOMMAND ( DATABASECOMMAND,
201                            CLASS )
202    IF ( PROCESSINGDECLARES )
203      IF ( LEADING WORDS OF DATABASECOMMAND = "END DECLARE")
204        PROCESSINGDECLARES = FALSE
205        CLASS = NONE
206      ELSE
207        CLASS = VARIABLE
208    ELSE
209      SWITCH ( LEADING WORDS OF DATABASECOMMAND )
210        CASE ("BEGIN DECLARE")
211          PROCESSINGDECLARES = TRUE
212          CLASS = NONE
213        CASE ("DECLARE", "OPEN", "FETCH", "CLOSE")
214          CLASS = SET
215        CASE ("EXECUTE", "PREPARE")
216          CLASS = DYNAMIC
217        CASE ("COMMIT", (ROLLBACK")
218          CLASS = TRANSACTION
219        CASE ( ALL OTHERS NOT LISTED )
220          CLASS = ATOMIC
```

PSEUDOCODE FOR CLASSIFYING DATABASE COMMANDS

FIG. 3

```
300 REPLACEDATABASECOMMAND( DATABASECOMMAND, CLASS, PACKAGE, TAG )
301   SWITCH ( CLASS )
302      CASE ( NONE )
303      CASE ( VARIABLE )
304         REPLACEVARIABLECOMMAND( DATABASECOMMAND, PACKAGE )
305      CASE ( ATOMIC )
306         REPLACEATOMICCOMMAND( DATABASECOMMAND, PACKAGE, TAG )
307      CASE ( SET )
308         REPLACESETCOMMAND( DATABASECOMMAND, PACKAGE, TAG )
309      CASE ( DYNAMIC )
310         REPLACEDYNAMICCOMMAND( DATABASECOMMAND, PACKAGE, TAG )
311      CASE ( TRANSACTION )
312         REPLACETRANSACTIONCOMMAND( DATABASECOMMAND, PACKAGE )
```

HIGH LEVEL PSEUDOCODE FOR REPLACING DATABASE COMMANDS

FIG. 4

```
400   REPLACEVARIABLECOMMAND( DATABASECOMMAND, PACKAGE )
401      IDENTIFY VARIABLE NAME AND TYPE OF DATABASECOMMAND
402      ADDTOHOSTVARIABLETABLE( NAME, TYPE )
403      ADDTOMODIFIEDPROGRAMFILE( APLANGUAGEDECLARATION( NAME, TYPE ))
```

PSEUDOCODE FOR REPLACING VARIABLE DECLARATION DATABASE COMMANDS

FIG. 5

```
500 REPLACEATOMICCOMMAND( DATABASECOMMAND, PACKAGE, TAG )
501 TAG = NEXT DATABASE COMMAND TAG
502 INPUTHOSTVARIABLES = IDENTIFY INPUT HOST VARIABLES
503                     IN DATABASECOMMAND
504 IF ( INPUTHOSTVARIABLES NOT EMPTY )
505    ADDTOMODIFIEDPROGRAMFILE (
506              APLANGUAGEHOSTVARIABLES( INPUTHOSTVARIABLES,
507                                      INHVSTRUCT )
508                            )
509 ELSE INHVSTRUCT = NULL
510 OUTPUTHOSTVARIABLES = IDENTIFY OUTPUT HOST VARIABLES
511                      IN DATABASECOMMAND
512 IF ( OUTPUTHOSTVARIABLES NOT EMPTY )
513    ADDTOMODIFIEDPROGRAMFILE (
514              APLANGUAGEHOSTVARIABLES( OUTPUTHOSTVARIABLES,
515                                      OUTHVSTRUCT )
516                            )
517 ELSE OUTHVSTRUCT = NULL
518 ADDTOMODIFIEDPROGRAMFILE (
519    APLANGUAGEDIFCALL( ATOMICDIF, PACKAGE, TAG, INHVSTRUCT,
520                      OUTHVSTRUCT )
521                         )
```

PSEUDOCODE FOR REPLACING ATOMIC DATABASE COMMANDS

FIG. 6

```
600 REPLACESETCOMMAND( DATABASECOMMAND, PACKAGE, TAG )
601    SWITCH ( FIRST WORD OF DATABASECOMMAND )
602       CASE ( "DECLARE" )
603          TAG = NEXT DATABASE COMMAND TAG
604          CURSOR = WORD FOLLOWING "CURSOR" IN DATABASECOMMAND
605 INPUTHOSTVARIABLES = IDENTIFY INPUT HOST VARIABLES
          IN DATABASE COMMAND
606 OUTPUTHOSTVARIABLES = IDENTIFY OUTPUT HOST VARIABLES
          IN DATABASE COMMAND
607          ADDTOCURSORTABLE( CURSOR, TAG )
608       CASE ( "OPEN" )
609          CURSOR = WORD FOLLOWING "CURSOR" IN DATABASECOMMAND
610          TAG = LOOKUPCURSORTABLE( CURSOR )
611          INPUTHOSTVARIABLES = IDENTIFY INPUT HOST VARIABLES
612                               IN DATABASECOMMAND
613          IF ( INPUTHOSTVARIABLES NOT EMPTY )
614             ADDTOMODIFIEDPROGRAMFILE (
615                   APLANGUAGEHOSTVARIABLES
                         ( INPUTHOSTVARIABLES,
616                                                  INHVSTRUCT)
617                )
618          ELSE INHVSTRUCT = NULL
619          ADDTOMODIFIEDPROGRAMFILE (
620             APLANGUAGEDIFCALL( SETDIFOPEN, PACKAGE,
                   TAG, INHVSTRUCT )
621             )
622       CASE ( "FETCH" )
623          CURSOR = WORD FOLLOWING "CURSOR" IN DATABASECOMMAND
624          TAG = LOOKUPCURSORTABLE( CURSOR )
625          OUTPUTHOSTVARIABLES = IDENTIFY OUTPUT HOSTVARIABLES
626                                IN DATABASECOMMAND
627          IF ( OUTPUTHOSTVARIABLES NOT EMPTY )
628             ADDTOMODIFIEDPROGRAMFILE (
629                   APLANGUAGEHOSTVARIABLES
                         ( OUTPUTHOSTVARIABLES,
630                                                  OUTHVSTRUCT)
631                )
632          ELSE OUTHVSTRUCT = NULL
633          ADDTOMODIFIEDPROGRAMFILE (
634             APLANGUAGEDIFCALL( SETDIFFETCH, PACKAGE, TAG,
                   OUTHVSTRUCT )
635             )
636       CASE ( "CLOSE" )
637          CURSOR = WORD FOLLOWING "CURSOR" IN DATABASECOMMAND
638          TAG = LOOKUPCURSORTABLE( CURSOR )
639          ADDTOMODIFIEDPROGRAMFILE (
640             APLANGUAGEDIFCALL ( SETDIFCLOSE, PACKAGE, TAG )
641             )
```

PSUEDOCODE FOR REPLACING SET DATABASE COMMANDS     FIG. 7

```
700 REPLACEDYNAMICCOMMAND( DATABASECOMMAND, PACKAGE, TAG )
701     SWITCH ( FIRST WORD OF DATABASECOMMAND )
702         CASE ( "PREPARE" )
703             TAG = NEXT DATABASE COMMAND TAG
704             LABEL = WORD FOLLOWING "PREPARE" IN DATABASECOMMAND
705             ADDTOLABELTABLE( LABEL, TAG )
706             ADDTOMODIFIEDPROGRAMFILE (
707                     APLANGUAGECOMMANDSTRING(DATABASECOMMAND,
708             ADDTOCURSORTABLE ( LABEL, TAG, EMPTY, EMPTY )
709                                                 STRINGST )
710                     )
711             ADDTOMODIFIEDPROGRAMFILE (
712                     APLANGUAGEDIFCALL (DYNDIFDEFER, PACKAGE, TAG, STRINGST)
713                     )
714         CASE ( "EXECUTE" )
715             IF ( SECOND WORD OF DATABASECOMMAND = "IMMEDIATE" )
716                 TAG = NEXT DATABASE COMMAND TAG
717                 ADDTOMODIFIEDPROGRAMFILE (
718                         APLANGUAGECOMMANDSTRING(DATABASECOMMAND,
719                                                     STRINGSTUCT)
720                         )
721                 ADDTOMODIFIEDPROGRAMFILE (
722                         APLANGUAGEDIFCALL(DYNDIFIMMED, PACKAGE, TAG,
723                                         STRINGSTUCT )
724                         )
725             ELSE
726                 TAG = LOOKUPLABEL( 2ND WORD OF DATABASECOMMAND )
727                 INPUTHOSTVARIABLES = IDENTIFY INPUT HOST
                                                VARIABLES
728                                             IN DATABASECOMMAND
729                 IF ( INPUTHOSTVARIABLES NOT EMPTY )
730                     ADDTOMODIFIEDPROGRAMFILE (
731                             APLANGUAGEHOSTVARIABLES(
732                                         INPUTHOSTVARIABLES,
733                                         INHVSTRUCT
734                                         )
735                             )
736                 ELSE INHVSTRUCT = NULL
737                 ADDTOMODIFIEDPROGRAMFILE (
738                     APLANGUAGEDIFCALL ( ATOMICDIF, PACKAGE, TAG,
                                INHVSTRUCT,
739                                         NULL )
740                     )
```

PSEUDOCODE FOR REPLACING DYNAMIC DATABASE COMMANDS

FIG. 8

```
800 REPLACETRANSACTIONCOMMAND( DATABASECOMMAND, PACKAGE )
801    SWITCH ( FIRST WORD OF DATABASECOMMAND )
802       CASE ( "COMMIT" )
803          ADDTOMODIFIEDPROGRAMFILE (
804             APLANGUAGEDIFCALL ( TRANSACTIONDIFCOMMIT )
805                                 )
806       CASE ( "ABORT" )
807          ADDTOMODIFIEDPROGRAMFILE (
808             APLANGUAGEDIFCALL ( TRANSACTIONDIFABORT )
809                                 )
```

PSEUDOCODE FOR REPLACING TRANSACTION DATABASE COMMANDS

FIG. 9

```
900 ADDTOBINDFILE ( DATABASECOMMAND, CLASS, TAG )
901    SWITCH ( CLASS )
902       CASE ( NONE, VARIABLE, DYNAMIC, TRANSACTION )
903       CASE ( ATOMIC )
904          MODIFIEDCOMMAND=FIXUPHOSTVARIABLES(DATABASECOMMAND)
905          ADDTOBINDFILE ( TAG, MODIFIEDCOMMAND )
906       CASE ( SET )
907          IF ( FIRST WORD OF DATABASECOMMAND = "DECLARE"
908          MODIFIEDCOMMAND=FIXUPHOSTVARIABLES(DATABASECOMMAND)
909             ADDTOBINDFILE( TAG, MODIFIEDCOMMAND )
```

PSEUDOCODE FOR ADDING DATABASE COMMANDS TO THE BIND FILE

FIG. 10

```
1000 BINDPROGRAM( BINDFILE, PACKAGENAME, DBMSNAME, PROCOPTS )
1001    ESTABLISH COMMUNICATION WITH DBMSNAME
1002    SENDMESSAGE( BEGIN_BIND < PACKAGENAME, PROCOPTS > )
1003    RESPONSE = RECEIVEMESSAGE
1004    IF ( RESPONSE.STATUS = ERROR ) TERMINATE
1005    FOR_EACH ( BINDFILEENTRY )
1006       SENDMESSAGE( BIND_DATABASE_COMMAND < BINDFILEENTRY.TAG,
1007                                            BINDFILEENTRY.COMMAND>)
1008       RESPONSE = RECEIVEMESSAGE
1009    SENDMESSAGE( END_BIND )
```

PSEUDOCODE FOR THE BIND PROGRAM

FIG. 11

```
1100 ATOMICDIF ( PACKAGE , TAG, INHVSTRUCT, OUTHVSTRUCT )
1101     HVVALUES = COPY INPUT HOST VARIABLE VALUES REFERENCED IN
                INHVSTRUCT
1102     HVDESC = CONSTRUCT DESCRIPTION TYPES OF INPUT VALUES
                USING INHSTRUCT
1103     SENDMESSAGES( EXECUTE_ATOMIC_COMMAND < PACKAGE, TAG,
         VHVALUES,
1104                                                     HVDESC > )
1105     RESPONSE = RECEIVEMESSAGE
1106     IF ( RESPONSE.STATUS = ERROR ) REPORT ERROR TO
                APPLICATION
1107     ELSE
1108        COPY RESPONSE.ELEMENTVALUES INTO OUTPUT HOST VARIABLES
                USING REFERENCES
1109                 AND TYPE DESCRIPTIONS IN OUTHVSTRUCT
1110                 AND RESPONSE.RESULTTYPES
```

PSEUDOCODE FOR THE ATOMIC COMMAND DATABASE INTERFACE FUNCTION

FIG. 12

```
1200 SETDIFOPEN( PACKAGE, TAG, INHVSTRUCT, SIZE )
1201     HVVALUES = COPY INPUT HOST VARIABLE VALUES REFERENCED IN
                INHVSTRUCT
1202     HVDESC = CONSTRUCT DESCRIPTION TYPES OF INPUT VALUES
                USING INHSTRUCT
1203     SENDMESSAGE( BEGIN_QUERY < PACKAGE, TAG, HVVALUES,
                HVDESC, SIZE > )
1204     RESPONSE = RECEIVEMESSAGE
1205     IF ( RESPONSE.STATUS = ERROR ) REPORT ERROR TO
                APPLICATION
1206     ELSE
1207        ADDTOACTIVECURSORS( PACKAGE, TAG, RESPONSE.ELEMENTS,
1208                                   RESPONSE.RESULTTYPES )
1209        ACTIVECURSORS[PACKAGE, TAG].STATUS = OPEN
1210        IF ( RESPONSE.STATUS = END_OF_QUERY )
1211           ACTIVECURSORS[PACKAGE, TAG].STATUS = CLOSED
```

PSEUDOCODE FOR DATABASE INTERFACE FUNCTION FOR
INITIATING SET ORIENTED DATA ACCESS

FIG. 13

```
1300 SETDIFFETCH( PACKAGE, TAG, OUTHVSTRUCT, SIZE )
1301     IF ( ACTIVECURSORS[PACKAGE, TAG].STATUS = NOT_ACTIVE )
1302         REPORT ERROR TO APPLICATION
1303     IF ( UNACCESSED ELEMENTS EXIST IN ACTIVECURSORS[PACKAGE,
             TAG] )
1304         COPY VALES OF NEXT ELEMENT INTO OUTPUT HOST VARIABLES
             USING
1305                     REFERENCES, AND TYPE DESCRIPTION IN
                         OUTHVSTRUCT
1306                     AND ACTIVECURSORS[PACKAGE,
                         TAG].RESULTTYPES
1307     ELSE IF ( ACTIVECURSORS[PACKAGE, TAG].STATUS = CLOSED )
1308         REPORT "END OF QUERY" TO APPLICATION
1309     ELSE
1310         SENDMESSAGE( CONTINUE_QUERY < PACKAGE, TAG, SIZE > )
1311         RESPONSE = RECEIVEMESSAGE
1312         IF ( RESPONSE.STATUS = ERROR ) REPORT ERROR TO
                 APPLICATION
1313         ELSE
1314             ACTIVECURSORS[PACKAGE, TAG].ELEMENTS =
                 RESPONSE.ELEMENTS
1315             IF ( RESPONSE.STATUS = END_OF_QUERY )
1316                 ACTIVECURSORS[PACKAGE, TAG].STATUS = CLOSED
1317                 COPY VALES OF NEXT ELEMENT INTO OUTPUT HOST
                     VARIABLES USING
1318                         REFERENCES AND TYPE DESCRIPTIONS IN
                             OUTHVSTRUCT
1319                         AND ACTIVECURSORS[PACKAGE,
                             TAG].RESULTTYPES
         PSUEDOCODE FOR THE DATABASE INTERFACE FUNCTION
         ACCESSING ELEMENTS OF SET ORIENTED DATA ACCESSES
```

FIG. 14

```
1400 DYNSETCLOSE ( PACKAGE, TAG )
1401     IF ( ACTIVECURSORS[PACKAGE, TAG].STATUS = NOT_ACTIVE )
1402         REPORT ERROR TO APPLICATION
1403     IF ( ACTIVECURSORS[PACKAGE, TAG] NOT = CLOSED )
1404         SENDMESSAGE( CLOSE_QUERY < PACKAGE, TAG > )
1405         RESPONSE = RECEIVEMESSAGE
1406         IF ( RESPONSE.STATUS = ERROR ) REPORT ERROR TO
                 APPLICATION
1407     REMOVEFROMACTIVECURSORS[PACKAGE, TAG]
         PSEUDOCODE FOR THE DATABASE INTERFACE FUNCTION
         FOR TERMINATING SET ORIENTED DATA ACCESS
```

FIG. 15

```
1500 DYNDIFIMMED( PACKAGE, TAG, STRINGREF)
1501     COMMAND = COPY OF COMMAND REFERENCED BY STRINGREF
1502     SENDMESSAGE( EXECUTE_IMMEDIATE < PACKAGE, TAG, COMMAND >
)
1503     RESPONSE = RECEIVEMESSAGE
1504     IF ( RESPONSE.STATUS = ERROR ) REPORT ERROR TO
             APPLICATION
```

PSEUDOCODE FOR THE DATABASE INTERFACE FUNCTION FOR
IMMEDIATE EXECUTION OF DYNAMIC DATABASE COMMANDS

FIG. 16

```
1600 DYNDIFDEFER( PACKAGE, TAG, STRINGREF)
1601     COMMAND = COPY OF COMMAND REFERENCED BY STRINGREF
1602     SENDMESSAGE( PREPARE_COMMAND < PACKAGE, TAG, COMMAND > )
1603     RESPONSE = RECEIVEMESSAGE
1604     IF ( RESPONSE.STATUS = ERROR ) REPORT ERROR TO
             APPLICATION
```

PSEUDOCODE FOR THE DATABASE INTERFACE FUNCTION FOR
DEFERED EXECUTION OF DYNAMIC DATABASE COMMANDS

FIG. 17

QUERY LANGUAGE EXECUTION ON HETEROGENEOUS DATABASE SERVERS USING A BIND-FILE BRIDGE BETWEEN APPLICATION AND DATABASE LANGUAGES

CROSS REFERENCE TO PENDING APPLICATIONS

This application includes material which overlaps material in pending U.S. patent application Ser. No. 07/499,114, filed Mar. 26, 1990, entitled "METHOD AND APPARATUS FOR DESCRIBING DATA TO BE EXCHANGED BETWEEN PROCESSES", inventors: Richard Demers, et al.; and U.S. patent application Ser. No. 07/500,031, filed Mar. 27, 1990, entitled "METHOD AND APPARATUS MINIMIZING DATA CONVERSIONS WHEN SHARING DATA BETWEEN PROCESSES", inventors: John G. Adair, et al.

BACKGROUND OF THE INVENTION

1. Technical Field

This invention addresses the problem of accessing a remote data repository, hereafter called a database management system (or DBMS), from an application program which is executing in a different computer than the DBMS.

2. Description of the Prior Art

Data repositories, or DBMSs, store information which can be used in many ways to manage, control, analyze, model, track, and document a wide variety of real work activities in business, commerce, science, and government. The information stored in DBMSs can be shared by various application programs which exploit the information for specific purposes. Because it is very difficult to maintain the same information in different DBMSs on different computers, it is important that application programs be able to access and manipulate needed information wherever it resides.

However, application programs must not only access and manipulate information in DBMSs, but also interact with humans via computer displays and keyboards. This interaction is greatly facilitated if the application program can execute on a computer which is physically near to the human. It is also sometimes the case that an application program developed and adapted to a specific computer environment defined by language, operating system, or computer may need to exploit data in, or the special features of, a DBMS which is adapted to (and runs on) a different computer environment. Therefore, it would be useful for application programs to be able to access and manipulate information in a DBMS which is located at a different computer than the computer of the application program.

Another aspect of maintenance of information in DBMSs is that there are many differently implemented DBMSs whose database commands are specialized to particular computing environments or data models. An important class of differently implemented DBMSs are those known as relation database systems. Within this class are those DBMSs whose database command language is known as SQL. C. J. Date in his book entitled "AN INTRODUCTION TO DATABASE SYSTEMS", Vol. 1, Addison-Wesley (4th Edition, 1986), describes in Chapter 2 a relational database system which is based on the SQL database command language. However, even within this restricted class of DBMSs, there are differences in the SQL commands which different implementations can accept and process. These differences in the SLQ database command language reflect the different operating environments of different implementation as well as differences in the language functions supported.

Application programs which exploit DBMSs supporting the SQL database command language are written in any one of several different programming languages. SQL database commands to access the DBMSs data are embedded in the programs of the applications. Application programs are prepared for execution in several steps. First a component of a Application Access Agent called the SQL Preprocessor examines the text of the application program and replaces embedded SQL database commands with calls to another component of the Application Access Agent called the Database Interface Functions. These Database Interface Functions mediate the actual interactions with the DBMSs to effect the execution of the SQL database commands. Next, the modified application program is processed by a language compiler which translates it into a machine dependent sequence of computer instructions. Finally, the translated application program is combined (or linked) with the Database Interface Functions to produce a module which can be invoked and executed in a specific computing environment.

In addition to replacing the SQL database commands embedded in an application program with calls to Database Interface Functions, some SQL Preprocessor systems and SQL DBMSs support the ability to analyze and prepare SQL database commands for execution well in advance of the need to perform the commands during execution of the linked application program. This preparation for database command execution, known as binding, significantly improves application program performance. This is because analysis of SQL database commands generally entails relatively costly I/O operations to compare the names of database objects (e.g., tables, columns, etc.) found in the commands to the names of objects present in the particular DBMS. In addition, for many SQL database commands, the determination of the best sequence of database steps necessary to perform the command entails consideration of a, possibly, large number of alternative sequences. Choosing the best sequence of steps is known as optimization. Once analysis and optimization have been completed, the DBMS can retain the result and use it whenever execution of the corresponding SQL database command is required.

The problem addressed by this invention is the provision of a mechanism and procedure by which application programs executing on one computer can exploit the full services of a DBMS running on a different computer with a, possibly, different computer environment. The invention specifically addresses exploitation of evolving and idiosyncratic features of the database command language of different implementations of the remote DBMSs. This tolerance of database command idiosyncrasies is achieved using a single embodiment (implementation) of the Application Access Agent programs, coupled via a communication protocol to the DBMSs in remote computers. The invention also achieves enhanced performance by supporting binding of database commands in advance of execution of the application program.

Alternative mechanisms addressing these goals include:

1. a (local) DBMS at the application program computer which is capable of interacting with other, remote DBMSs to perform database commands at those DBMSs (i.e., a distributed database system);

2. remote execution of the database calls which could have been made to a local DBMS implementation using a Remote Procedure Call (RPC) mechanism;

3. a program on the application program computer which accepts, analyses, and optimizes database commands and sends (communicates) the resulting sequence of database steps to the remote DBMS for immediate or deferred execution;

4. communicating the database commands of the application program to a program (or device) at the remote computer of the DBMS which issues the database commands to its (now local) DBMS on behalf of the (now remote) application program; and 5. the Remote Database Access (RDA) communication protocol under consideration by national and international standards bodies.

The first alternative above requires advanced database function which is not available in most DBMS implementations. In addition, it requires that such a DBMS be present at the application program computer. This might entail significant cost for licenses, maintenance, and resources (CPU and storage).

Because database call interfaces are usually specific to a DBMS implementation and its computing environment, the second alternative above would require special support at the application program computer for each differently implemented remote DBMS. This multiplicity of support for specific DBMS call interfaces is costly to develop and must be extended whenever new remote DBMS implementations become available.

The third alternative above is extremely sensitive both to the kinds of database steps used at the remote DBMS and to the database command language features and functions supported by the program at the application program which computes the needed steps. Furthermore, functional enhancements to the database command language of the remote DBMS must be matched by similar enhancements to the Application Access Agent.

The fourth alternative above cannot analyze and prepare database commands prior to execution because the database commands of the application program are not presented to the remote DBMS prior to the execution of the application program on the application program's computer.

The fifth alternative above (RDA), also does not support analysis and processing of database commands prior to the execution of the application program which invokes the execution of the database commands. This leads to (possibly) significant performance penalties and does not allow amortization of the cost of analyzing and optimizing database commands over multiple executions of the application program.

SUMMARY OF THE INVENTION

This invention operates in an environment consisting of a multiplicity of computer systems connected by a communication facility. Some of the computing systems are designated application program computers while the remaining computing systems are designated as DBMS computers. Both the application program computers and the DBMS computers may vary in their implementation and computing environments. The communication mechanism is operated according to a communication protocol agreed upon by the application program and DBMS computers. In this invention, the application program computers are physically separate from the DBMS computer; therefore, from the perspective of an application computer, a DBMS computer is a "remote" data site.

According to the invention, an application program which exploits a DBMS supporting a database command language can be written in any one of several different programming languages. Database commands to access the DBMS data are embedded in the program of the application. A Application Access Agent prepares the application program for execution in several steps and supports execution with full exploitation of DBMS data and facilities.

First, a component of the Application Access Agent called the Preprocessor examines the text of the application program and replaced embedded database commands with calls to another component of the Application Access Agent called the Database Interface Functions. This component mediates the actual interactions with the DBMS to effect the execution of the database commands. Next, the modified application program is processed by a language compiler which translates it into a machine-dependent sequence of computer instructions. The translated application program is combined or linked with the Database Interface Functions to produce a module which can be invoked and executed in a specific computing environment.

The embedded database commands extracted from the application program are assembled while the application program is being manipulated by the Preprocessor. The extracted database commands are analyzed and prepared for execution during preprocessing and are assembled. A Bind program component of the Application Access Agent interacts with a remote DBMS to bind the database commands from the application program to a named DBMS which retains the database commands for execution in response to execution of the application program.

Last, the Database Interface Function component of the Application Access Agent receives the calls in the application program which replace the database command. When a call is made from the application program, the Database Interface Function component notifies the DBMS of the called command, and the DBMS executes the command, sending the result back to the Database Interface Function. The received results are passed to the application program immediately or in response to subsequent requests from the application program.

This invention solves the problem of exploiting the facilities of a remote DBMS from a different application program computer by defining the necessary elements of a protocol for:

1. causing database commands to be bound (analyzed, optimized, and retained) at a remote DBMS computer; and 2. initiating execution of retained commands at the remote DBMS computer.

The goal of support for idiosyncratic versions of the database command language is achieved by limiting the degree to which the Application Access Agent programs at the application program computer must analyze and understand the meaning of database commands to the minimum necessary to transform application programs to properly call for the execution of their database commands. Additionally, the protocol for binding database commands at a remote DBMS computer is adapted so as to be insensitive to idiosyncrasies of the database command language syntax and semantics of the particular remote DBMS implementation.

Another significant feature of this invention is the extraction of Host Variables from the database language command prior to their being bound at the remote DBMS. The language-specific variables are replaced with markers which include information as to the type and size of the Host Variable. This isolates database language differences resulting from language dialects to the DBMS site. This enables the Application Access Agent to talk to all possible DBMSs the same way, independent of the DBMS type.

Other features and advantages of this invention will become apparent from the following detailed description of the presently preferred embodiment of the invention, taken in conjunction with the accompanying drawings.

BRIEF DESCRIPTION OF THE DRAWINGS

FIG. 2 shows a pseudo-code implementation of a preprocessor of this invention.

FIG. 3 shows a pseudo-code implementation for classifying database commands according to this invention.

FIG. 4 shows a pseudo-code implementation for replacing database commands according to this invention.

FIG. 5 shows a pseudo-code implementation for replacing variable declaration database commands according to this invention.

FIG. 6 shows a pseudo-code implementation for replacing atomic database commands according to this invention.

FIG. 7 shows a pseudo-code implementation for replacing set database commands according to this invention.

FIG. 8 shows a pseudo-code implementation for replacing dynamic database commands according to this invention.

FIG. 9 shows a pseudo-code implementation for replacing transaction database commands according to this invention.

FIG. 10 shows a pseudo-code implementation for adding database commands to the bind file according to this invention.

FIG. 11 shows a pseudo-code implementation for debined program according to this invention.

FIG. 12 shows a pseudo-code implementation for the atomic command database interface function according to this invention.

FIG. 13 shows a pseudo-code implementation for a database interface function for initiating set-oriented data access according to this invention.

FIG. 14 shows a pseudo-code implementation showing a database interface function for accessing elements of set-oriented data accesses according to this invention.

FIG. 15 shows a pseudo-code implementation for a database interface function for terminating set-oriented data access according to this invention.

FIG. 16 shows a pseudo-code implementation of a database interface function for immediate execution of dynamic database commands according to this invention.

FIG. 17 shows a pseudo-code implementation for a database interface function for deferred execution of dynamic database commands according to this invention.

DESCRIPTION OF THE PREFERRED EMBODIMENT

Figure 1:
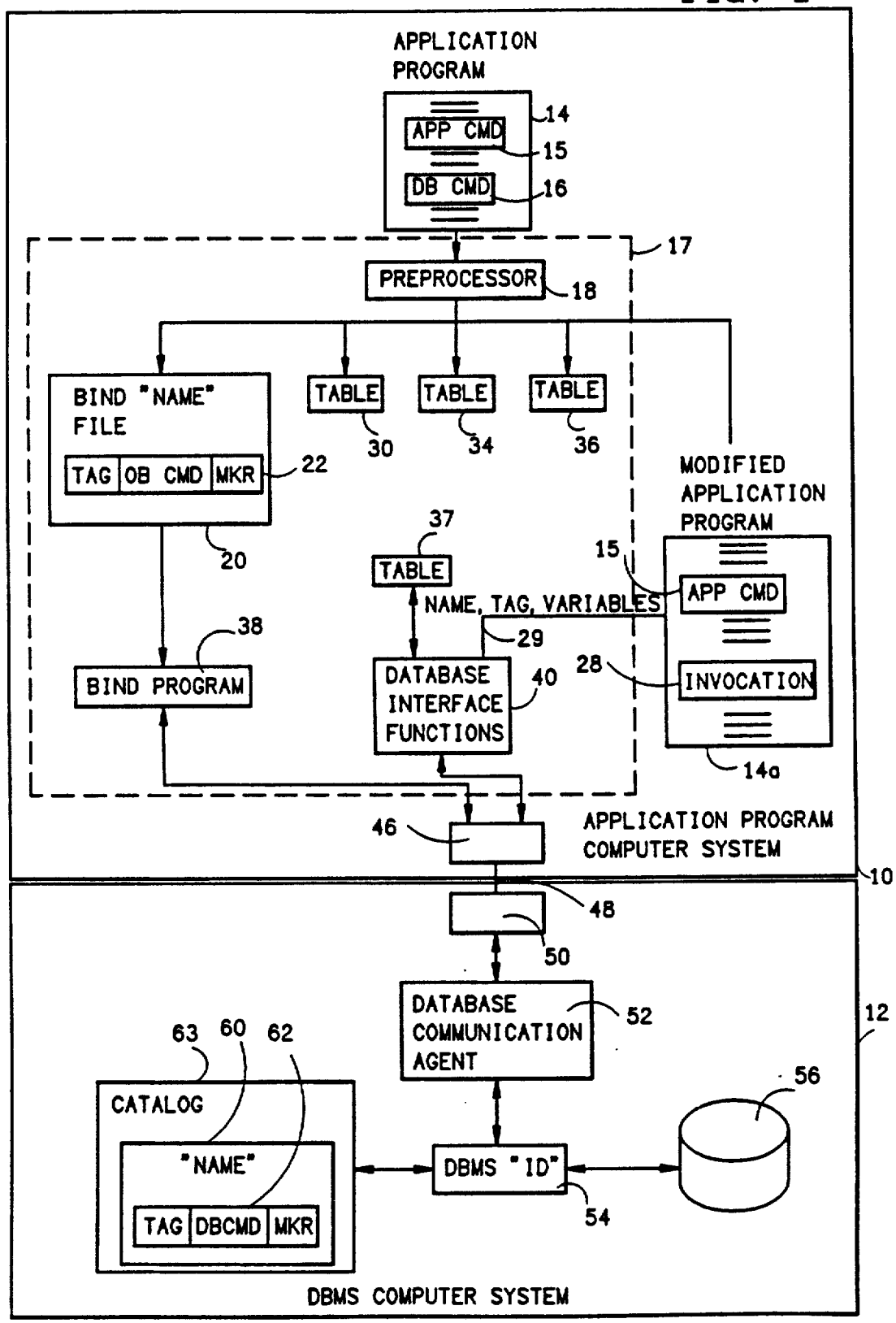
FIG. 1 is a block diagram showing the primary complement of elements which form the invention in combination with other elements significant to the practice of the invention.

The invention is illustrated in its essential form in FIG. 1 of the drawings where reference numeral 10 indicates a first computer system which is approximately configured using conventional means to execute an application program, as well as the functions of this invention. The computing system 10 can be, for example, a mainframe machine of the 3090 type manufactured by and available from the IBM Corporation, The Assignee of this application. As is known, the 3090 computing system includes a CPU with a mainstore, input/output channel control means, direct access storage devices, and other I/O devices coupled thereto. Such a computing system may operate under the control of an operating system of the MVS type which executes application programs written in languages such as PL/1 or Cobol. The components of this invention which operate in this computing system can be written in, for example, the programming language called "C". A user interface to such a computing system would be any terminal provided with interactive time sharing under the TSO (time sharing option) available from the Assignee of this application. It is asserted that the environment established by the characteristics of the machine, language, and operating system of the first computing system 10 differs from the environment of the computing system 12. The computing system 12 can comprise, for example, a personal computer of the PS/2 type with an OS/2 EE operating system. Such a system can support a DBMS written in the "C" language which, in turn, supports a dialect of the well-known SQL language. A local agency for the purposes of this invention can be a program in the computing system 12 written in "C" language.

An application program 14 is written to execute on the computer system 10. However, database commands such as the command 16 are embedded in the program 14 in order to process data in the database of the computer system 12. Due to the difference between the environments of the systems 10 and 12, the command 16 (and other database commands in the application program) is written in a language which is different from the language in which the rest of the application program is written. The database commands are syntactically correct for execution on the computer system 12. However, they may include information such as variables, parameter values, and so on which are in a format acceptable to the computing system 10, but foreign to the computing system 12.

The invention concerns the preprocessing of the application program to identify the database commands, process and assemble them prior to compilation of the application program, and bind them in the computing system 12 for execution during run-time of the program 14. The invention also provides for the modification of the application program 14 to a form that is totally native to the computing system 10 by replacement of the database commands with calls in the language of the application program. After compilation of the application program, the invention response to the calls in the application program by requesting execution of the related database command by the computing system 12. The invention receives the results of the executed command on behalf of the application program.

The components for performing the functions of the invention reside in an application Access Agent 17. Preferably, the Access Agent 17 is a set of programs entered conventionally into the computing system 10 which are invoked using well-known techniques to perform the novel functions of the invention.

The primary components of the Access Agent 17 include a Preprocessor 18, a Bind program 38, and a Database Interface Function 40. Data structures which are built, filled, and used in the application Access Agent include a Bind file 20, a Host Variable table 30, and a cursor table 34.

The Preprocessor 18 analyzes the application program 14, recognizes database commands such as the command 16, and classifies the database commands based on syntactic cues. After the Preprocessor recognizes and classifies the database commands, it replaces them in a modified version 14a of the application program whose contents are unchanged except for the replacement of the embedded database commands. Once classified, database commands are further analyzed to produce, in the programming language of the application program, a database function invocation 28 whose type and content are dependent on the classification of the database command. When the Preprocessor 18 replaces a database command in the application program, it assigns a tag to that command, recognizes input and output Host Variables of the command, places them into the Host Variable table 30, correlates the replaced command with other related database commands, if necessary, and places an invocation (reference numeral 28 in FIG. 1) in the application program. The application program invocation 28 includes package name (explained below), tag, input variable structure parameters and output variable structure parameters, which are explained in detail below. Last, the Preprocessor 18 retains each database command, together with its tag assigned them, and a marker describing input and output variables in the Bind file 20. A modified command is indicated by reference numeral 22. The Bind file has an identifier, "NAME", and retains modified database commands until the Preprocessor 18 has completed modification of the application program. The Bind file is used as input to the Bind program 38 for binding of the commands to the DBMS in the computing system 12.

The function of binding the database commands extracted from the application 14 to a remote DBMS is assigned to the Bind program 38. The Bind program establishes communication with a named DBMS and then conducts a sequence of operations which send the entries in the Bind file 20 to the remote DBMS, with information required to bind the commands to the computing system 10 which executes the application process.

The Database Interface Functions 40 comprises a set of functions linked to the application program 14a when the program is compiled. The Database Interface Functions 40 effect the execution of database commands at a remote DBMS using a database command invocation protocol in response to invocation of the modified application program 14a, such as the invocation 28. When invoked from the application program, the Database Interface Functions 40 communicate the parameters in the invocation which identify the application program, the tagged database command which has been bound at the DBMS, and the variables necessary for execution of the command.

In order to appreciate the invention from the point of view of a relational DBMS, reference is again made to FIG. 1 wherein the computing systems 10 and 12 are connected by conventional communication access elements (which can include communication adapters 46 and 50 at each system) which are physically connected by an interface 48. The communication facility 46, 48, 50, is conventional. For the purposes of this invention, the facility is capable of identifying specific computers from their names, establishing communication between programs running on different computers, transferring data between connected communicating programs, and terminating communication between computers.

In the computing system 12, a Application Access Agent 52 conducts the binding protocol with the Bind program 38, passing tagged database commands received from the Bind program to a DBMS 54 which is identified by a name "ID". The DBMS 54 accepts the database commands and places them in a package 60 identified by the name "NAME" which identifies the application program 14a as the source of the package contents. One database command 62 with a tag is shown in the package 60. As is conventional, the identification "NAME" is the tie that "binds" the command to the application program 14. Packages are stored in a DBMS catalog 63. The DBMS 54 maintains a relational database contained in conventional storage 56.

Upon receipt of a message requesting execution of a database command from the Database Interference Functions 40, the Application Access Agent 52 interprets the received message to determine what services are requested of the DBMS 54. The agent 52 then requests the indicated services, waits for the response, and, upon receiving the response, passes the results of the services back to the Database Interface Function 40.

INTRODUCTION

The Preprocessor 18 is a critical link in the process of preparing the application program 14 for eventual execution(s). The Preprocessor 18 performs the following basic functions:

1. recognition and classification of database commands embedded in the application program;

2. replacement of database commands embedded in the application program with statements in the language of the application program which declare variables in that language or invoke the Database Interface programs; and 3. recording of database commands for eventual submission to the DBMS 54 by the Bind program 38.

The database command language Preprocessor 18 takes as input a file containing the instructions of the application program specified in some programming language. Interspersed with the programming language instructions are database commands expressed in the syntax of some database command language. To be concrete, we shall assume that the database command language is any of the several variants of SQL. The Preprocessor 18 recognizes the database commands and replaces them with statements of the application program language. The resulting (modified) application program 14a is one of the outputs of the Preprocessor 18 and is suitable for translation by a compiler for the application program language. A second output of the Preprocessor 18 is a retained list (e.g., file) containing certain of the database commands, some of which have been slightly modified by the Preprocessor 18. This second file, known as the Bind file 20, is an input to the Bind program 38 of the Application Access Agent.

FIG. 2 illustrates the high level function of the database command Preprocessor 18. Lines 100-103 show that the parameters of the database command Preprocessor are lists (e.g. files) containing the application program (input), the package name for the database commands of the application program (input), the modified application program (output), and the Bind file for the Bind program (output). Line 103 shows scanning the Application Program File. Lines 104-105 show recognizing database commands and copying lines which are not database command lines from the Application Program File to the Modified Program File. Lines 106-107 specify invocation of a classification module with the recognized command (input) and computed class (output) as parameters of the classification module. Lines 108-109 specify invocation of a replacement module with the recognized command and computed class as input parameters, a package name associated with the application program, and the tag assigned to the command as an output parameter. Lines 110-111 specify invocation of a module to add commands to the Bind file with the recognized command, its computed class and assigned tag as input parameters.

DESCRIPTION OF RECOGNITION AND CLASSIFICATION OF DATABASE COMMANDS

Database commands in a database command language (e.g., SQL) are recognized via syntactic cues that depend on a specific pre-processor implementation. These can be tags which precede the database command (e.g., the string "EXEC SQL"). Database commands can be classified into one of the following categories:

1. Host Variable declarations;
2. Atomic commands;
3. Set Oriented commands;
4. Dynamic commands; or
5. Transaction commands.

Host Variable declarations specify that a particular identifier (name) is to be a variable, of a particular type, which can be manipulated directly by statements of the application program language, as well as by database commands. Host Variable declarations are recognized by syntactic cues unique to each programming language (e.g., "BEGIN DECLARE SECTION" and "END DECLARE SECTION" for PL/1 variable declarations for SQL) and consist of an identifier and a type name.

Atomic database commands are commands which can be executed with a single interaction between the application program and the DBMS. They include Data Definition commands (e.g, "CREATE ... ", "ALTER ... ", "DROP ... ", etc. in SQL), single row data selections, and Update, Delete, or Insert commands. Atomic database commands are recognizable by their syntactic prefix, e.g., the first or first and second words of the command in SQL. Some Atomic database commands may contain references to Host Variables. These Host Variable references are distinguished by being preceded by an easily recognizable mark (e.g., a ":" in some SQL implementations). Host Variable references may be for input to the database command or to receive results (output) from the database command. The distinction must be made between input and Output Host Variables. In SQL Output Host Variables follow the keyword "INTO". Toe accommodate language enhancements whose syntactice prefixes are not known by the Preprocessor, these unknown database commands are classified as atomic database commands and all the host variable references are taken to be input variables.

Set oriented database commands consist of the following types:

1. commands to specify a set of database items (e.g., "DECLARE CURSOR ... " in SQL);
2. commands to initiate processing of a set of database items (e.g., "OPEN ... " in SQL);
3. commands to access the next element of a set of database items (e.g., "FETCH ... " in SQL);
4. commands to terminate processing of a set of database items (e.g., "CLOSE ... " in SQL).

The Preprocessor 18 of the Application Access Agent must recognize and handle each of these Set Oriented commands specially. Recognition and classification is again based on the initial keywords of the database command.

Dynamic database commands allow an application program to postpone specification of a database command until execution of the application program. Dynamic database commands are submitted to the DBMS for analysis, optimization, (temporary) retention, and execution during the execution of the application program. Dynamic database commands are specific, distinguishable commands in the application program which indicate that the actual database command will be provided during execution. The database command to be executed is a parameter of the dynamic database command and may be supplied from a string type Host Variable. Like other database commands, dynamic database commands can be recognized by then reading keywords (e.g., "EXECUTE IMMEDIATE ... ", PREPARE ... " in SQL).

Transaction commands are database commands for committing or aborting the current database transaction. In some SQL implementations, the Transaction commands are "COMMIT WORK" and "ROLLBACK WORK".

FIG. 3 illustrates the classification module of the Preprocessor 18. This illustration shows classification of database commands using the concrete example of SQL. Lines 200-201 show that the parameters of the Preprocessor classification module are a database command (input) and the determined class (output). Lines 202-207 show that database commands encountered while with a SQL DECLARE scope are classified as Host Variable commands unless the command begins with "END DECLARE". Line 209 is a multi-way branch statement based upon the leading words of the Database Command. The five cases of the multi-way branch (lines 210, 213, 215, 217, and 219) set the computed class of the Database Command. Note that in most cases, several different database commands will cause a branch to be satisfied.

The Preprocessor 18 in the application program computer analyzes the application program, recognizes database commands, and classifies them based on syntactic cues rather than a complete parsing of the full database command. Both the recognition of database commands and their classification are accomplished without knowledge of, and independently of, the specific intended remote DBMSs at which the application program's database commands will be bound. The classification step examines only the initial keyword(s) of database commands, and therefore it is independent of the idiosyncracies of the database command language syntax that follows. As an example of classification, the statement EXEC SQL CREATE TABLE EMP (NAME CHAR(23)); would be recognized by the classification module as an SQL database command and would be classified as an Atomic command.

DESCRIPTION OF REPLACEMENT OF DATABASE COMMANDS

Each recognized and classified database command in the application program 14 must be replaced with application program programming language statements which cause the command to be executed. In general, for each database command of the application program, the Preprocessor 18 will replace the database command with a call to a Database Interface Function. The Database Interface Functions 40 are responsible for causing the database commands to be executed in a remote DBMS by communication with that DBMS via a communication protocol. The conventions for passing parameters to Database Interface Functions depend on the computer environment of the application program and Application Access Agent programs and are left to the needs of the implementer.

Host Variable declarations are replaced by the language statement corresponding to the declaration of a language variable with the same name as the name in the Host Variable declaration and the same type. The Host Variable name and type are also recorded in the Host Variable Table 30, which is an associative table managed by the Preprocessor 18. The Host Variable Table is used by the Preprocessor 18 during replacement and Bind file processing.

Atomic database commands are replaced by calls to the Database Interface Function 40 for executing Atomic commands. In order to indicate which database command retained at the remote DBMS is to be executed, a mechanism for identifying retained database commands is required. For this, the invention identifies the set of database commands of an application program and identifies each of the database commands of the application program.

The invention identifies a package (the set of database commands of an application program) with a name that is unique to the remote DBMS which retains and executes the commands. While many naming conventions are possible in the invention, the name of a package of an application program is the name of the "family" of the application program followed by the name of the application program. In the Figures, the name is "NAME". The individual database commands of an application program package are identified by tags (e.g., numbers) assigned by the Preprocessor 18, placed in the Bind file, and communicated to the DBMS by the Bind program 38.

The call to the Database Interface Function which replaces an Atomic database command includes parameters specifying the package name and database command tag. The call to the Database Interface Function for Atomic database commands must also communicate values for the Input Host Variables of the command (if any) and receive values of the Output Host Variables (if any). The mechanism used by the invention is to search the database command for Host Variable cues (a ":" or following "INTO" or "USING" for some implementations of SQL) and add parameters to the Database Interface Function to call to pass (or receive) the values of the corresponding variables of the host language. The Preprocessor 18 must also consult the Host Variable Table to insure that the indicated Host Variables are declared. Each Host Variables is removed and replaced with a marker denoting a replaced Host Variable by type, size, format, etc.

All the set oriented database commands relating to the same set of database items are grouped together based on their shared Cursor Name, which is easily extracted from the database command. The same database command tag is associated with all the commands relating to the same set of Database items. Set specification commands are simply removed from the application program. However, the Preprocessor program assigns a database command tag and associates it with the Cursor Name found in the set specification command. Another associative table, the Cursor Table 34, is maintained by the Preprocessor 18 to record the association between Cursor Names and database command tags. The remaining set oriented database commands are replaced with calls to Database Interface Functions specific to the (sub)class of the command. The set processing initiation and access commands may have Host Variables. Processing for the Host Variables of these set oriented database commands is similar to that for the Atomic database commands. As described earlier, Host Variables contained in Atomic database commands whose initial syntactice prefix was not recognized and understood by the Preprocessor are assumed to be input variables.

Dynamic database commands are processed similarly to Atomic or set oriented database commands. A tag is assigned to the dynamic database command. Dynamic database commands specify another database command to be submitted for immediate analysis, optimization, and execution, or a database command to be submitted with one dynamic database command and executed with another. The distinction is syntactically evident in the corresponding database commands. In the case of immediate execution ("EXECUTE IMMEDIATE . . . " in SQL), the Preprocessor 18 assigns a tag to the database command and replaces ti with a call to the Database Interface Function for immediate execution of dynamic database commands. In the case of deferred execution, the dynamic database command ("PREPARE . . . " in SQL) contains a label which can be referenced in other database commands to effect the execution. The Preprocessor 18 assigns a database command tag to the command and associates that tag with the label in the command using an associative Label table 36. The deferred execution dynamic database command (i.e., "PREPARE . . . " in SQL) is replaced with a call to the Database Interface Function for deferred execution dynamic database commands. The database command to be submitted by a dynamic database command may be specified by a character string literal expression or by a text string type Host Variable and the call to the Database Interface Function must take this into account and pass the correct text string containing the database command to be processed, The database command for executing a deferred dynamic database commands (e.g, in SQL either "EXECUTE <label> . . . " or "OPEN <label> . . . " followed by "FETCH <label> . . . and "CLOSE <label> . . . ") is replaced with a call to the Database Interface Function 40 for executing that statement. The call to the Database Interface Functions 40 uses, as a parameter, the database command tag, from the Label Table 36, associated with the "PREPARE . . ." command which causes the dynamic database command to be analyzed, optimized, and (temporarily) retained. The Database Interface Functions used to execute dynamic database commands are the same ones used for Atomic or set oriented database commands.

Transaction database commands are replaced by calls to the appropriate transaction Database Interface Function.

FIG. 4 illustrates the high level function of the program replacement process of the application program Preprocessor 18. Line 300 shows that the replacement process takes as input parameters a database command, its class, and the name of the package of database commands for the application program. The tag assigned to the command is an output parameter. Line 301 is a multi-way branch on the class of the database command. The remaining lines (302-312) call modules specialized in the replacement of application program text for specific classes of database commands.

FIG. 5 illustrates the function of the program module for replacement of Host Variable declarations using SQL as a concrete example. Line 400 shows the parameters of this module. Line 401 analyses the Database Command parameter to determine the name of the program Host Variable and its type. Line 402 enters the Host Variable into the Host Variable Table 30. Line 403 produces code in the language of the application program 14 and adds to it to the Modified Program File. An application program language dependent module ("AP Language Declaration") produces code in the language of the application program to declare a variable with the specified Name and Type.

FIG. 6 illustrates the function of the program module for replacement of Atomic database commands using SQL as a concrete example. Line 500 shows the parameters of this module. Line 501 allocates a tag for the database command. Lines 502-503 identify the Input Host Variables by searching the database command for the simple keywords or punctuation which signify the presence of an Input Host Variable. The identification of Input Host Variables also checks that the identified Host Variables are present in the Host Variable Table. Lines 504-509 add code to create a descriptive structure which can be used by Database Interface Functions to access the values of the Host Variables during execution. An application program language dependent module ("AP Language Host Variables") produces code in the language of the application program to create and fill the structure to describe the location and type of the Input Host Variables and returns the "name" of that structure. Lines 510-517 perform a similar function for Output Host Variables. Lines 518-521 add to the Modified Program File code in the language of the application program to call the Database Interface Function 40 for executing Atomic database commands using a language dependent module ("AP Language DIF call"). The necessary parameters for invocation of the "Atomic DIF" Database Interface Function are shown on lines 519-520.

FIG. 7 illustrates the function of the program module for replacement of the class of set oriented database commands using SQL as a concrete example. Line 600 shows the parameters of this module. Line 601 is a multi-way branch on the first word of the database command. The first CASE of the multi-way branch (lines 602-605) processes the database command for specification of a set of database items as the database command result. Line 603 allocates a tag for the database commands relating to the same result set (i.e., the same Cursor name in SQL). Lines 604-607 determine the Cursor name for the command and associates that name with the allocated tag in the Cursor Table 34. Lines 605 and 606 convey the input and output Host Variables in the Set Oriented specification to where they are needed when replacing the initiating and access commands (OPEN and FETCH). These are saved in the Cursor Table. Thus, for a later instance of FETCH, either the output variables are used accompanying the FETCH or, if none, the output variables saved in the Cursor Table from the DECLARE_CURSOR are used. This also applies to the OPEN statement. The second CASE of the multi-way branch (lines 608-621) processes the database command for initiation of processing of the database command result set. Lines 608-609 determine the Cursor name of the database command and the tag associated with the Cursor name. Lines 611-618 process Input Host Variables in a manner similar to Host Variable processing in the replacement for Atomic database commands. Lines 619-621 add to the Modified Program File code in the language of the application program to call the Database Interface Function for initiating processing of set oriented database commands using a language dependent module ("AP Language DIF call"). The necessary parameters for invocation of the "Set DIF open" Database Interface Function are shown on line 620. The third CASE of the multi-way branch (lines 622-635) processes the database command for accessing the database items in the database command result set. Lines 623-624 determine the Cursor name of the database command and the tag associated with the Cursor name. Lines 625-632 process Output Host Variables in a manner similar to Host Variable processing in the replacement for Atomic database commands. Lines 633-635 add to the Modified Program File code in the language of the application program 14 to call the Database Interface Function for accessing a database item in the result set of a set oriented database command using a language dependent module ("AP Language DIF call"). The necessary parameters for invocation of the "Set DIF fetch" Database Interface Function are shown on line 634. The last CASE of the multi-way branch (lines 636-641) process the database command for terminating processing of the result set of a set oriented database command. Lines 637-638 determine the Cursor name of the database command and the tag associated with the Cursor name. Lines 639-641 add to the Modified Program File code in the language of the application program 14 to call the Database Interface Function 40 for termination of processing result set of a set oriented database command using a language dependent module ("AP Language DIF call").

FIG. 8 illustrates the function of the program module for replacement of dynamic database commands using the example of SQL. Line 700 shows the parameters of this module. Line 701 is a multi-way branch on the first word of the database command. The first CASE of the multi-way branch (lines 702-712) processes the database command for specifying a database command for deferred execution. Line 703 allocates a tag for the database commands which specify and eventually execute the dynamically supplied database command. Lines 704-705 determine the Label of the dynamically specified and executed database command and associate that Label with the allocated tag in the Label Table 36. Line 706 enters the label into the Cursor Table where it must be in order to be found by the Preprocessor 18 in case the execution of the Dynamic deferred statement is "OPEN Lable . . . ", for example. Lines 707-710 add code to create a descriptive structure which can be used by the Database Interface Function to access the text value of the dynamically defined database command during execution. An application program language dependent module ("AP Language Command String") produces code in the language of the application program to create and fill the structure to describe the location of the text string containing the dynamically specified database command and returns the "name" of that structure. Lines 711-713 add to the Modified Program File code in the language of the application program to call the Database Interface Function for dynamically specifying a database command for deferred execution using a language dependent module ("AP Language DIF call"). The necessary parameters for invocation of the "Dyn DIF defer" Database Interface Function are shown on line 712. The second CASE of the multi-way branch (lines 714-740) processes the database command for immediate or deferred execution of dynamically specified database commands. Lines 715-724 handle the case of immediate execution of a dynamically specified command. Line 716 allocates a tag for the command. Lines 717-720 generated code in the Modified Program File in a manner similar to that used in the "PREPARE" case of this module. Lines 721-724 add to the Modified Program File code in the language of the application program to call the Database Interface Function for immediate execution of a dynamically specified database command using a language dependent module ("AP Language DIF call"). The necessary parameters for invocation of the "Dyn DIF immed" Database Interface Function 40 are shown on line 724. Lines 725-740 handle the case of deferred execution of a dynamically specified database command. Lines 727-735 process Input Host Variables in a manner similar to Host Variable processing in the replacement for Atomic database commands. Lines 737-740 add to the Modified Program File code in the language of the application program to call the Database Interface Function 40 for initiating the deferred execution of dynamically specified database commands using a language dependent module ("AP Language DIF call"). The necessary parameters for invocation of the "Atomic DIF" Database Interface Function are shown on line 740.

FIG. 9 illustrates the function of the program module for replacement of transaction database commands using the concrete example of SQL. Line 800 shows the parameters of this module. Line 801 is a multi-way branch on the first word of the transaction database command. Lines 802-805 add to the Modified Program File code in the language of the application program 14 to call the Database Interface Function for initiating transaction commit. Lines 806-809 add to the Modified Program File code in the language of the application program 14 to call the Database Interface Function for initiating transaction abort.

In summary, after the database commands are recognized and classified as described above, the commands are replaced in a modified version of the application program 14a whose contents are unchanged except for the replacement of the embedded database commands. Database commands classified as Host Variable Declarations are placed without modification into the modified application program. The other database commands are further analyzed to produce a Database Interface Function invocation in the programming language of the application program whose type and contents are dependent on the classification of the database command. This replacement is accomplished by assignment of a tag (if needed) to be used in later execution of that command, recognition of input and Output Host Variables (if any) and placement of them into a structure dependent on the application program's language, correlation (if needed) with related database commands, and placement of an invocation of the appropriate Database Interface Function in the appropriate programming language that includes the following parameters: package name, tag, input variable structure, and output variable structure.

The replacement of database commands in the application program depends solely on syntactic cues rather than a complete parsing of the full database command. This replacement is accomplished without knowledge of, and independently of, the DBMS 54 at which the application program's database commands will be bound. The replacement step examines only the initial keyword(s) of database commands, and the Host Variables (which are recognized by syntactic cues) and therefore it is independent of the idiosyncracies of the database command language syntax that follows.

The following set of SQL database commands embedded in PI/I illustrates the mechanism described above for replacement of database commands in the application program. Assume that the application program contains the following database commands:

```
EXEC SQL BEGIN DECLARE SECTION;
   DCL PARTNO BIN FIXED(15);
   DCL DESCR CHAR(10);
   DCL NAME CHAR(15);
EXCE SQL END DECLARE SECTION;
EXEC SQL SELECT PARTNUM, DESCRIPTION
   INTO :PARTNO, :DESCR
   FROM INVENTORY
   WHERE PARTNAME = :NAME;
```

An instance of the replacement mechanism above would produce the following:

```
DCL PARTNO BIN FIXED(15);
DCL DESCR CHAR(10);
DCL NAME CHAR(15);
CALL ATOMICDBINTFN(packageP,
   tag1,
   IVARS(1,
         (TYPE(NAME),ADDR(NAME))),
   OVARS(2,
         (TYPE(PARTNO),ADDR(PARTNO)),
         (TYPE(DESCR), ADDR(DESCR)))
   );
```

DESCRIPTION OF BIND FILE GENERATION

The Preprocessor 18 must prepared the information needed by the Bind program to bind the database commands of the application program to a remote DBMS. This information consists of the text of (some of) the database commands embedded in the application program. Only Atomic and one type of set oriented specification database commands (in the case of SQL, DE- CLARE CURSOR) need to be entered into the Bind file 22. The Input Host Variable references (variable names) embedded in the database commands which are inserted into the Bind file are replaced with simple Host Variable markers. Furthermore, these markers are associated with the types of the Host Variables referenced by the database command. This association may be by appending a positional list of type names, or by placing the type name following the Host Variable mark in the database command. This module of the Preprocessor uses the Host Variable table defined above to determine the types of the Host Variables referenced by the database command. Note well that this replacement of the Input Host Variable references allows application program language specific Preprocessor programs to recognize and process not only simple Host Variable references, but also expressions over Host Variables. This advanced facility can be supplied for different languages, and to different degrees by different implementations of the Preprocessor program of the Application Access Agent without requiring changes to either the Bind program, Database Interface Functions, communication protocols, or DBMS implementations. (Of course, complex Host Variable expressions in database commands might impact the code which invokes the Database Interface Functions in order to compute the value of the Host Variable expressions.) References to Output Host Variables can be removed from the database commands appended to the output Bind file.

FIG. 10 illustrates the function of the program module of the Preprocessor 18 for constructing the Bind file 22 which is an input to the Bind program 38 of the Application Access Agent. Line 900 shows the parameters of this module. Line 901 is a multi-way branch on the Class of the database command. Line 902 intercepts database commands which do not need to be added to the Bind file. Lines 903-905 add Atomic database commands to the Bind file. The module "Fix Up Host Variables" replaces the names of input Host Variables in the database command with markers and adds the type of the Host Variable (either following the marker or in an ordered list associated with the database command). It also may remove references to Output Host Variables from the database command. Line 905 adds the Database command, as modified by "Fix Up Host Variables", to the Bind file. Lines 906-909 process set oriented database commands. Line 907 limits this processing to the commands which specify the result set of database items. Lines 908-909 perform the same function as in lines 904-905.

In summary, since the Preprocessor 18 of the Application Access Agent 17 executes independently of the binding of database commands to a specific remote DBMS, it is necessary during pre-processing to retain certain database commands in modified form, together with the tag used in the modified application program to identify each database command. The Bind file is the mechanism by which this information is retained. This Bind file will be used as input to the Bind program of the Application Access Agent during binding to the remote DBMS.

This invention permits the Preprocessor 18 of the Application Access Agent to be executed once and the results (Bind file 22) bound at different times to several different DBMSs. Therefore this invention is more efficient than alternative mechanisms that perform pre-processing and binding in a single step, because both steps would have to be executed for each DBMS to which the application program is bound. Furthermore, such alternative mechanisms require using and holding remote DBMS resources during the recognition, classification, and replacement of database commands in the application program. In this invention, these steps are performed independently of the binding to any specific DBMS and do not require resources at any remote DBMS during the Pre-processor execution.

Following the example given above, a Bind file entry is illustrated that is generated from the application program in:

```
TAG = TAG1
COMMAND = SELECT PARTNUM, DESCRIPTION
   FROM INVENTORY
   WHERE PARTNAME = :CHAR(15)
```

THE BIND PROGRAM OF THE APPLICATION ACCESS AGENT

Introduction

The Bind program 38 of the Application Access Agent 17 interacts with a remote DBMS to effect the binding (analysis, optimization, and retention) of database commands from the application program 14. The Bind program takes as input the following items:

1. a Bind file prepared by the Preprocessor;
2. the name of the remote DBMS at which the database commands should be bound; and
3. processing options to be used by the remote DBMS for binding the database commands.

The binding of the database commands is accomplished using an agreed upon communication protocol between the Bind program at the application program computer and the DBMS at a remote computer.

DESCRIPTION OF THE BIND PROGRAM

The Bind Program 38 first determines the communication address of the named remote DBMS using mechanisms which may be particular to the computing environment of the application program computer. Then the Bind program establishes communication with the remote DBMS. Establishment of communication may involve identifying the user on whose behalf the Bind program is executing. The mechanisms for establishing communication and for user identification are outside the scope of this invention. Once communication is established, the Bind program 38 indicates that it wishes to initiate binding database commands using an agreed upon message format. This message, the BEGIN\_BIND contains the bind processing options to be used by the DBMS to process the database commands to be bound. Bind processing options can include the name of the package of database commands to be constructed, whether the package is new or replaces a package of the same name, parsing rules (e.g., the symbol used to delimit text string literals in database commands), and the authorized user responsible for the application program package.

Having established communication and received an acceptable response to the bind initiation message, the Bind program 38 of the Application Access Agent transmits each database command in the Bind file 20 to the DBMS using another agreed upon message format. This message, the BIND\_DATABASE\_COMMAND message, contains the database command 22 as modified by the Preprocessor 18 and the tag associated with that database command. Note that the Input Host Variable references in the database command no longer carry Host Variable identifiers, but rather the type of the value to be passed to the DBMS when the database command is executed. The remote DBMS, upon receipt of a BIND_DATABASE_COMMAND message, will analyze, optimize, and retain the database command contained in the message. The database command will be incorporated into a package of database commands (whose name was specified in the BEGIN_BIND message) for eventual executions by the application program and will be associated with the tag received in the BIND_DATABASE_COMMAND. Together, the package name and the tag uniquely identify the analyzed and optimized database command. If errors are detected by the DBMS, they are reported in a response message to the Bind program and the database command is not retained in the package. Otherwise, the DBMS signals acceptance of the database command in its response message. When all the database commands from the Bind file 38 have been sent to the remote DBMS in BIND_DATABASE_COMMAND messages, the Bind program requests completion of the package resulting from the binding of the database commands via an END_BIND message. Upon receipt of an END_BIND message the DBMS completes the package and its optimized database commands by "committing" changes to the catalogs of the DBMS and responds with an acknowledgement message indicating the outcome of the attempt to "commit" the package. END_BIND completes the processing o the package according to the Processing Options accompanying the BEGIN_BIND message and the events that occurred during the processing of each BIND_DATABASE_COMMAND. Typically, this will result in the retention of the package in the DBMS when no errors are encountered. If the Bind program or the DBMS terminates during binding of database commands, or if a communication failure interrupts binding of database commands, or if errors are detected in one or more database commands sent via bind_database command messages and the Processing Options specify that a package should not be created if errors occur, the package is not retained by the remote DBMS.

FIG. 11 illustrates the processing of the Bind program 38 of the Application Access Agent 17 using SQL as a concrete example. Line 1000 illustrates the parameters which are passed to the Bind program. Line 1001 establishes communication with the DBMS specified by the DBMSname parameter. Lines 1002-1004 illustrate the initiation of the bind process with the sending of the BEGIN_BIND message containing the package Name and the bind processing options. Lines 1005-1008 send the database commands and their tags to the remote DBMS in BIND_DATABASE_COMMAND messages. Lines 1009 terminates the binding processing with the sending of an END_BIND message to complete processing of the package being created.

Since the Preprocessor 18 executes independently of the binding of database commands to a specific remote DBMS, the function of binding to a remote DBMS is performed by the Application Access Agent 17 using the Bind file 20 produced by the Bind file generator mechanism of the Application Access Agent. The bind process initiates the binding of a package at a named DBMS by establishing communication with that DBMS, and sending a BEGIN_BIND message to that DBMS together with the information needed at the DBMS to create a package, including the package name and Processing Options. Following bind initiation, the entries in the Bind file 20 at the application program computer 10 are sent to the remote DBMS, including the tag used in the modified application program and its associated database command as parameters to BIND_DATABASE_COMMAND messages. After all the entries in the Bind file have been sent to the remote DBMS and processed there, the bind process terminates binding by sending the END_BIND message.

This mechanism permits the Bind file entries for the application program 14 to be bound at different times to several different DBMSs. Furthermore, it permits the cost of analyzing and optimizing each database command to be amortized over possibly several executions of that database command, possibly invoked by multiple instances of the application program at the same time or at different times, by the same user or different users. Since communications costs can be relatively expensive, the elapsed time (and thus the communication expense) to perform the execution of an already optimized database command can be significantly less than the elapsed time needed to analyze and optimize it. This is an additional advantage of this invention over alternative mechanisms which analyze and optimize database commands for each execution request or for each invocation of the application program.

The following elaboration of the example given above illustrates package contents resulting from binding a Bind file entry that was generated from the application program:

```
PACKAGEname, ProcOpts, Number of database commands = 1:
    Optimized code for TAG1:
        Expect one input variable of type CHAR(15)
        Use (internal access path) to access (internal
            database table name) with key = input variable.
        Produce (internal element name1, internal element name2)
        as output
    Original database command for tag1: SELECT PARTNUM, DESCRIPTION
        FROM INVENTORY
        WHERE PARTNAME = :CHAR(15)
```

DESCRIPTION OF DATABASE INTERFACE FUNCTIONS OF THE APPLICATION ACCESS AGENT

Introduction

The Database Interface Functions 40 of the Application Access Agent are programs which effect execution of database commands at a remote DBMS using the database command invocation protocol. Database Interface Functions 40 are linked to the application program and called from the (modified) application program during the execution of the application program. The exact interface between Database Interface Functions and the application program may depend on the computing environment of the application program computer 10. Database Interface Functions obey a communication protocol agreed upon with the remote DBMS to effect the execution of bound database commands in packages at the remote DBMS. Database Interface Functions are responsible for communicating the values of Input Host Variables to the remote DBMS and for setting the values of Output Host Variables to the values returned from the remote DBMS as a result of executing a database command.

In response to (or prior to) the first call to a Database Interface Function 40 during the execution of an application program, the Application Access Agent 17 must establish communication with the remote DBMS 54. The mechanism for determining which remote DBMS and its computer (address) is dependent upon the computing environment of the application program computer. Establishment of communication may involve identifying the user on whose behalf the application program is executing. The mechanisms for user identification are outside the scope of this invention. Establishment of communication may involve exchanging agreed upon messages to identify the services needed, the DBMS to be used, and the level (or version) of the communication protocol to be used in subsequent communication.

This section describes the Command invocation protocol (i.e., the messages exchanged between the Database Interface Functions of the Application Access Agent and the remote DBMS) as well as the actions taken by the Database Interface Functions and the remote DBMS in response to messages of the protocol.

DESCRIPTION OF THE ATOMIC DATABASE COMMAND DATABASE INTERFACE FUNCTION

The Database Interface Function which is called from an executing application program to perform and Atomic database command constructs and transmits an EXECUTE_ATOMIC_COMMAND message to the remote DBMS. The EXECUTE_ATOMIC_COMMAND message contains the following elements:

1. the name of the application program package in which the command is located;
2. the tag of the particular Atomic database command;
3. the values of the Input Host Variables of the Atomic database command; and
4. a description of the types of the Input Host Variable values.

The Atomic database command Database Interface Function must access the values of the Input Host Variables and construct a description of their types for inclusion in the EXECUTE_ATOMIC_COMMAND message. Note that the information needed to construct the EXECUTE_ATOMIC_COMMAND is included in the information passed to the Database Interface Function by the modified application program. Upon receipt of an EXECUTE_ATOMIC_COMMAND message, the remote DBMS 54 locates the retained execution plan for the indicated database command in the package indicated by the package name in the received message. If this step succeeds, the remote DBMS 54 executes the plan for the located database command using the Input Host Variable values received in the EXECUTE_ATOMIC_COMMAND message. If execution of the Atomic database command is not successful, the DBMS prepares and transmits a message to the Database Interface Function with an indicator, in an agreed upon format, describing the reason why execution did not succeed. If the execution is successful, and the database command in question produces results consisting of one or more result values (i.e., the original database command contained Output Host Variables), these values, along with descriptions of their data types, are turned to the Database Interface Function in a message in the agreed upon format. The Database Interface Function 40 then copies the returned result values into the corresponding Output Host Variables of the application program. (Note that conversions from the value representations of the DBMS to the corresponding value representation in the application program computing environment may be necessary. The mechanisms to specify and support such value transformations are beyond the scope of this invention.)

FIG. 12 illustrates the Database Interface Function and Command Execution protocol for Atomic database commands. Line 1100 shows the invocation of "Atomic DIF" with the parameters prepared during replacement of database commands. Note that the InHVstruct and OutHVstruct contain both references to Host Variables and the types of the referenced Host Variables. Note also that either or both of the InHVstruct and outHVstruct may be empty. Lines 1101-1102 use the InHVstruct to obtain values for the Input Host Variables and construct a description of their types. Lines 1103-1105 send an EXECUTE_ATOMIC_COMMAND message. Line 1106 receives the response and checks for errors. Lines 1107-1110 copy any received result values into Output Host Variables. Conversion between compatible types and different representations of the same type may occur during copying of Output Host Variables.

DESCRIPTION OF SET ORIENTED DATABASE COMMAND DATABASE INTERFACE FUNCTIONS

Introduction

The Database Interface Functions which are called from the executing application program to perform set oriented database commands are somewhat more complicated. Set oriented database commands produce (possibly large) sets of result values. Because the cost of sending and receiving messages via today's communication facilities is relatively high, it is of great importance to minimize the number of message exchanges needed to execute set oriented database commands. To this end, when set oriented data access is initiated by an executing application program (i.e., "OPEN . . . " in SQL), the corresponding Database Interface Function constructs and transmits a OPEN_QUERY message which instructs the remote DBMS to response, in a single response message, with multiple result elements. Subsequently, the Database Interface Function for accessing Set data access results either returns the next, already received, result element, or demands another group of result elements from the remote DBMS using a CONTINUE_QUERY message.

However, if update or delete of the current result set element database commands ("UPDATE CURRENT OF CURSOR . . . " or "DELETE CURRENT OF CURSOR . . . "in SQL) are to be processed, the return of multiple result elements must be suppressed. This is because the update and delete current element database commands operate on the "current" element of the result set. Fortunately, the DBMS in its analysis of the set oriented specification database commands ("DECLARE CURSOR ... FOR UPDATE" in SQL) and its association of current element update or delete database commands with the corresponding set specification command can determine when result elements of a set oriented database command might be updated or deleted. If the DBMS determines that update or delete of a result element is possible, it will return only a description of the data in response to OPEN_QUERY and a single result element in response to OPEN_QUERY and CONTINUE_QUERY messages.

Because processing of the result elements of a set oriented data access involves multiple database commands of the application program, the set oriented database command Database Interface Functions maintain an Active Cursor Table 34 to record the status of active set oriented data accesses. The Active Cursor Table associates the tag of the Set Oriented commands with the following information:

1. status of OPEN or CLOSED;
2. description of types of result element values;
3. a sequence of already received elements of the result set; and
4. indications of which received elements have been accessed.

DESCRIPTION OF DATABASE INTERFACE FUNCTION FOR INITIATING SET ORIENTED DATA ACCESS

The Database Interface Function responsible for initiating processing of set oriented data access (e.g., in response to "OPEN ... " in SQL) constructs and transmits a message to the remote DBMS, in the agreed upon format of an OPEN_QUERY message, containing the following elements:

1. the name of the application program package in which the command is located;
2. the tag of the particular set oriented database command;
3. the values of the Input Host Variables of the set oriented database command;
4. a description of the types of the Input Host Variable values; and
5. an indication of how much of the result set should be returned.

The specification of how much of the result set should be returned can take several forms. Either a number of result elements or the amount of space available to receive result elements can be agreed upon. (Another alternative is to allow the DBMS to attempt to return the entire set of result elements and make use of flow control or pacing features of the communication facility to regulate the flow of result elements.) The remote DBMS, upon receipt of an OPEN_QUERY, must locate and access the retained execution plan for the indicated set oriented data access. If this succeeds, execution of the retained plan is initiated using the received Input Host Variable values and as many result elements as requested (or will fit in the space indicated) will be produced and formatted into a reply message in an agreed upon format. If the DBMS has determined that the set oriented database command may be subject to set oriented updates or deletes, it will return only the description of the data in response to OPEN_QUERY and a single result element in response to CONTINUE_QUERY. In both these cases, the DBMS suspends execution of that command such that execution can be resumed to produce further result elements at a later time. If the production of result elements exhausts the set of elements specified by the database command before exceeding the quantity of result elements specified in the OPEN_QUERY message, an indication that the set is exhausted is returned with the reply message and the database terminates processing of the query.

The elements of the reply message to the OPEN_QUERY message contains the following elements:

1. a description of the data types of the values of a single result element or row in SQL;
2. a sequence of result elements; and
3. a indication of successful, "end of query", or unsuccessful execution.

The Database Interface Function which initiates processing of set oriented database commands receives the response message from the DBMS and checks the indicator as to whether execution was successful. If not an error indication is returned to the application program. If successful, the Database Interface Function enters the command tag, data type descriptions, and sequence of elements into the Active Cursor Table 37. If the DBMS indicated that the result set was exhausted, the status in the Active Cursor Table is set to CLOSED; otherwise to OPEN.

FIG. 13 illustrates the Database Interface Function and Command Execution protocol for initiating set oriented data access. Line 1200 shows the invocation of "Set DIF open" with the parameters prepared during replacement of database commands. Lines 1201-1202 process Input Host Variables similarly to the processing described for the Atomic command Database Interface Function. Line 1203 sends a OPEN_QUERY message. Lines 1204-1205 receive the response and check for errors. Lines 1206-1211 add the set being processed to the Active Cursors. The pseudocode for this and the subsequent set oriented Database Interface Functions represent access to members of the Active Cursors by bracketed expressions, such as the one on line 1209. Also, in the interest of clarity, mechanisms for keeping track of which received elements of the result set have been accessed are not explicitly represented. Note that lines 1210-1211 may set the status of the Active Cursors to CLOSED before any result elements have been accessed. This allows the CLOSE_CURSOR message to be avoided (see Pseudocode for termination of set oriented data access).

DESCRIPTION OF DATABASE INTERFACE FUNCTION FOR ACCESSING ELEMENTS OF SET ORIENTED DATA ACCESSES

The Database Interface Function responsible for accessing elements of set oriented data accesses is called from the application program to obtain the values of the next element of the result set ("FETCH ... " in SQL). This Database Interface Function must determine that the set oriented database command has been initiated by examining Active Cursor Table 37. If access has not been initiated, an error is reported to the application program. Otherwise, the Database Interface Function determines whether there are elements which have been received from the remote DBMS and not yet accessed by the application program. If there are unaccessed elements, the Database Interface Function copies the values of the next unaccessed element into the Output Host Variables of the application program, using the type description returned from the remote DBMS and maintained in the Active Cursor Table. The element Database Interface Function also marks the (newly) accessed element as accessed. If the status in the Active Cursor Table is CLOSED, and all received elements have been accessed, the element access Database Interface Function returns the set exhaustion ("end of query") error to the application program.

If all the elements already received for the particular set oriented data access have been accessed and the status is OPEN, the Database Interface Function constructs and transmits a message in the agreed upon format of a CONTINUE_QUERY message. The elements of a CONTINUE_QUERY message are:

1. the name of the application program package in which the command is located;
2. the tag of the particular set oriented database command; and
3. an indication of how much of the result set should be returned.

Upon receipt of a CONTINUE_QUERY message, the remote DBMS determines whether the indicated database command from the indicated package has been initiated. If not, an error indication is returned in an agreed upon message format. If the indicated database command has been initiated, the remote DBMS resumes execution of the plan for that database command to produce additional result elements and assembles as many result elements as were requested (or will fit in the indicated space) into a reply message in an agreed upon format. If the DBMS (in its infinite wisdom) has determined that the set oriented database command may be subject to set oriented updates or deletes, a single result element is returned. If the production of result elements exhausts the set of elements specified by the set oriented database command before exceeding the quantity of result elements specified in the CONTINUE_QUERY message, an indication that the set is exhausted is returned with the reply message and the DBMS terminates processing the query. The element access Database Interface Function associates the received result elements and DBMS set exhaustion indication with the Active Cursor Table entry. If any elements were returned from the remote DBMS, the first of them is copied to the Output Host Variables of the application program and marked as having been accessed.

FIG. 14 illustrates the Database Interface Function and Command Execution protocol for accessing elements of set oriented data accesses. Line 1300 shows the invocation of "Set DIF fetch" with the parameters prepared during replacement of database commands. Lines 1301-1302 check whether processing has been initiated for the set specified by the package and tag parameters. If there are already received but unaccessed elements, lines 1303-1306 copy the values of the next such element into output Host Variables in ways similar to those of the Atomic command Database Interface Function. Otherwise, lines 1307-1308 report "end of query" to the application if an "end of query" response has been received from the DBMS. If the already received elements have all been accessed, and "end of query" not been received, lines 1309-1314 replenish the supply of unaccessed elements by sending a CONTINUE_QUERY message and receiving the response. If additional elements are received, the first such one is copied into Output Host Variables by lines 1317-1319. Note that the status of Active Cursors is also updated in the same way as during the initiation of set oriented data access.

DESCRIPTION OF DATABASE INTERFACE FUNCTION FOR TERMINATING PROCESSING OF SET ORIENTED DATA ACCESSES

The Database Interface Function called in response to the execution of the database command which terminates processing of a set oriented data access ("CLOSE ..." in SQL) must examine the Active Cursor Table 37 to determine whether the set oriented database command has been initiated. If not, an error is reported to the application program. If the Active Cursor Table 37 status is CLOSED, the Database Interface Function returns "end of query" to the application program. Otherwise, the Database Interface Function prepares and sends a CLOSE_QUERY message to the remote DBMS. The agreed upon format of the CLOSE_QUERY message contains:

1. the name of the application program package in which the command is located; and
2. the tag of the particular set oriented data access.

Upon receipt of a CLOSE_QUERY message, the remote DBMS determines whether the indicated database command from the indicated package has been initiated and is still active. If so, the DBMS completes (terminates) processing of the indicated set oriented data access and responds favorably to the Database Interface Function. If not, the DBMS return an error response in an agreed upon format. The set oriented termination Database Interface Function removes the entry for the Set Oriented command from the Active Cursor Table.

FIG. 15 illustrates the Database Interface Function and Command Execution protocol for terminating set oriented data access. Line 1400 shows the invocation of "Set DIF close" with the parameters prepared during replacement of database commands. Lines 1401-1402 check whether processing has been initiated for the set specified by the package and tag parameters. Lines 1403-1406 send a CLOSE_QUERY message and process its response if the "end of query" indication has not been received from the DBMS. Line 1407 removes the set specified by the package and tag parameters from Active Sets.

DESCRIPTION OF DATABASE INTERFACE FUNCTION FOR PROCESSING DYNAMIC DATABASE COMMANDS

The Database Interface Functions called to process the specification of a database command during application program execution transmit the text of the dynamically specified database command to the remote DBMS for either immediate or deferred execution. The Database Interface Function for immediate execution of a dynamically specified database command prepares and transmits an EXECUTE_IMMEDIATE message, in an agreed upon format, to the remote DBMS. The elements of the EXECUTE_IMMEDIATE message are:

1. the name of a package at the remote DBMS;
2. the database command tag assigned by the language Preprocessor program; and
3. the text of the database command to be dynamically defined and executed.

Upon receipt of an EXECUTE_IMMEDIATE message the remote DBMS locates the package referenced by the message and confirms that it does not contain a (permanently) retained command with the same tag as the tag in the EXECUTE_IMMEDIATE message. Then the received database command text is analyzed, optimized, and immediately executed. If errors are detected during this process, an error response message is returned to the Database Interface Function. The Database Interface Function for processing the specification of a dynamically specified database command for deferred execution prepares and transmits a PREPARE_COMMAND message to the remote DBMS. The elements of the PREPARE_COMMAND message are:

1. the name of a package at the remote DBMS;
2. the database command tag assigned by the language Preprocessor program; and
3. the text of the database command to be dynamically defined and executed.

Upon receipt of a PREPARE_COMMAND message the remote DBMS locates the package referenced by the message and confirms that it does not contain a (permanently) retained command with the same tag as the tag in the PREPARE_COMMAND message. Then the database command text from the PREPARE_COMMAND message is analyzed, optimized, and (temporarily) retained as part of the package specified in the PREPARE_COMMAND message. If no errors are detected, the remote DBMS prepares a reply message indicating successful execution. Otherwise, an error message will be returned to the Database Interface Function. The dynamically defined database command can subsequently be executed using the Database Interface Functions and messages for execution of Atomic or set oriented database commands.

FIG. 16 illustrates the Database Interface Function and Command Execution protocol for immediate execution of dynamically specified database commands. Line 1500 shows the invocation of "Dyn DIF immed" with the parameters prepared during replacement of database commands. Line 1501 obtains a copy of the database command to be executed. Lines 1502-1504 send an EXECUTE_IMMEDIATE message to the remote DBMS and process the response.

FIG. 17 illustrates the Database Interface Function and Command Execution protocol for immediate execution of dynamically specified database commands. Line 1600 shows the invocation of "Dyn DIF defer" with the parameters prepared during replacement of database commands. Line 1601 obtains a copy of the database command to be prepared for deferred execution. Lines 1602-1604 send a PREPARE_COMMAND message to the remote DBMS and process the response.

DESCRIPTION OF DATABASE INTERFACE FUNCTION FOR PROCESSING TRANSACTION DATABASE COMMANDS

The Database Interface Functions called to process transaction commit or abort database commands generate COMMIT_transaction or ABORT_transaction messages. These messages contain no additional elements. Upon receipt of a COMMIT_transaction or ABORT_transaction message, the remote DBMS commits or aborts the current database transaction. The remote DBMS replies to the Database Interface Function with a message, in an agreed upon format, indicating the outcome of the transaction database command.

THE DBMS COMMUNICATION AGENT

Introduction

This invention is dependent upon the agreed upon protocols for binding and database command execution. DBMS implementations, however, are usually greatly dependent on the computer environment in which they operate. This dependency is partially reflected in the precise ways in which the services of the DBMS are invoked for execution. An important aspect of this invention is that the communication protocols do not demand that new DBMS function be implemented. Rather, the invention is directed towards exploiting the full range of whatever function is available in already implemented DBMS systems. To this end, the invention relies on a component of the DBMS (or separate from the DBMS but running on the same computer) which is capable of communicating with the programs of the Application Access Agent and invoking the services of the DBMS proper to effect the execution of the functions associated with the messages of the binding and command execution protocols. This component is called the DBMS Communication Agent 52 (see FIG. 1).

The preferred implementation of the DBMS Communication Agent 52 is as an integrated component of the DBMS. Alternatively, the information content of the messages of the Binding and Command Execution protocols is sufficient to allow a separate implementation of the DBMS Communication Agent. A separated implementation of the DBMS Communication Agent can obtain needed DBMS services using the DBMS invocation mechanisms native to the computing environment of the DBMS computer.

DESCRIPTION OF THE DBMS COMMUNICATION AGENT

The DBMS Communication Agent 52 is the component of the DBMS computer with which the Binding program 38 and the Database Interface Functions 40 of the Application Access Agent 17 communicate. When communication is established by programs of the Application Access Agent, it is the DBMS Communication Agent to which the communication is directed.

Upon receipt of a message from the Application Access Agent, the DBMS Communication Agent 52 interprets the received message to determine what DBMS services are requested. The DBMS Communication Agent then requests the indicates services from the DBMS proper. This will, in general, involve making one or more invocations of DBMS services. For example, the EXECUTE_ATOMIC_COMMAND message requires the DBMS to execute a single retained Database Command, while the OPEN_QUERY and CONTINUE_QUERY messages require that the DBMS Communication Agent obtain and return multiple result set elements. The DBMS actions and services elicited by each of the messages of the binding and command execution protocols have been described in the preceding descriptions of the Bind program 18 and Database Interface Functions 40. The DBMS Communication Agent is also responsible for casting the DBMS responses to requested DBMS services into response messages to the Bind program and Database Interface Functions of the application program computer. This involves examining the execution results and indicators from the DBMS proper and fabricating the appropriate response messages. The relationship between the local results of DBMS service requests and the contents of the response messages has also been described in the descriptions of the Binding program and Database Interface Functions.

It is notable that the DBMS Communication Agent is, like the programs of the Application Access Agent, relatively insensitive to the detailed syntax and semantics of the Database Command language. Database Commands received via the Binding protocol and in Dynamic Database Command messages can be passed as received, or after some straightforward transformations, to the DBMS proper.

In summary, the DBMS Communication Agent is responsible for managing communication with the programs of the Application Access Agent. The DBMS Communication Agent 52, upon recognition and understanding of received messages, also oversees the invocation of the services of the DBMS proper to effect the execution of the database services requested by the Application Access Agent of the application program computer 10. In addition, the DBMS Communication Agent 52 interprets the results and indications from the DBMS proper in order to fabricate and transmit response messages to the Bind program and Database Interface Functions of the Application Access Agent of the Application Program computer.

SUMMARY OF THE METHOD OF THE INVENTION

Figure 18:
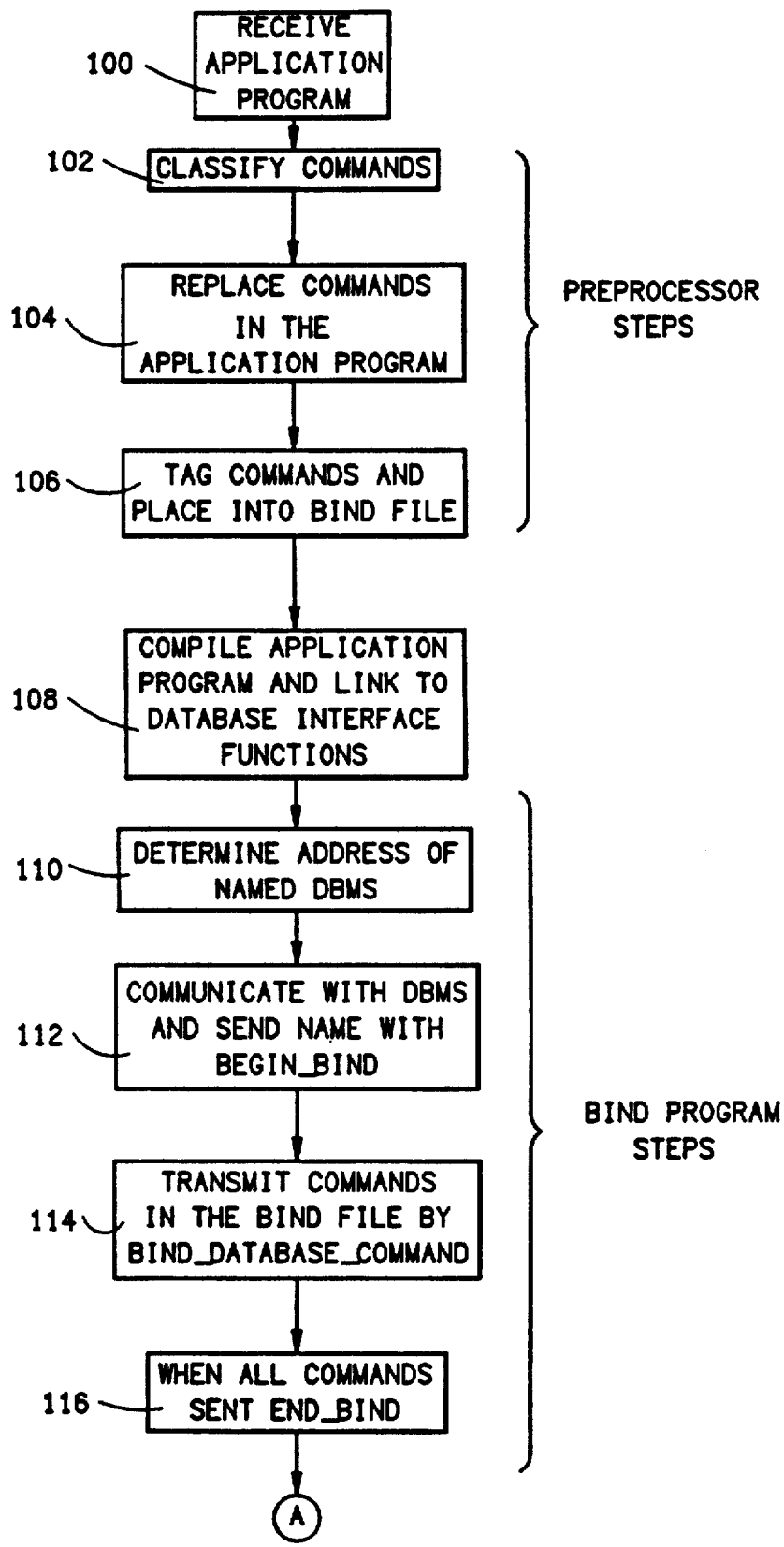
FIGS. 18-20 together comprise a flow diagram which illustrates the method of this invention.
Figure 19:
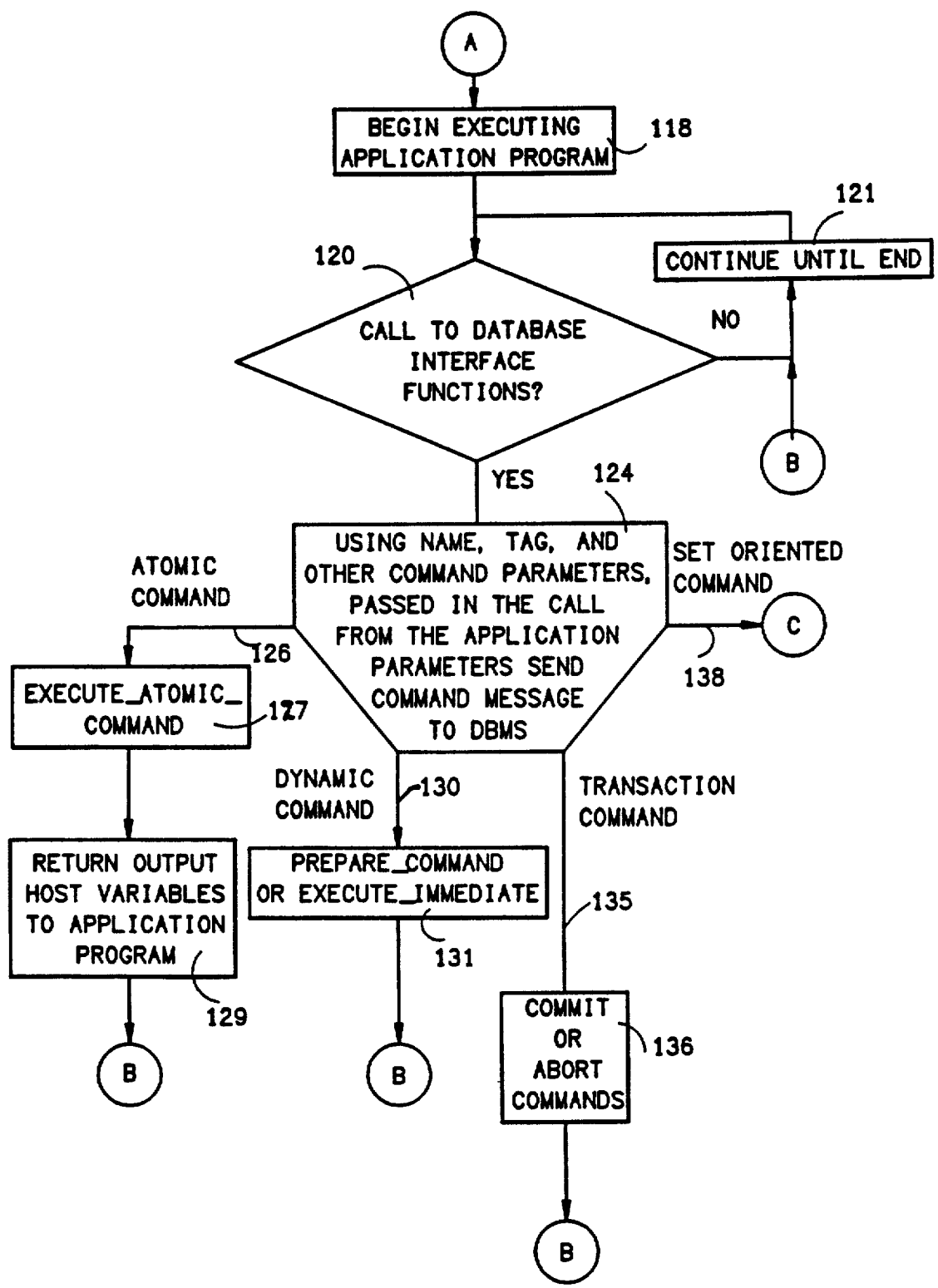
Figure 20:
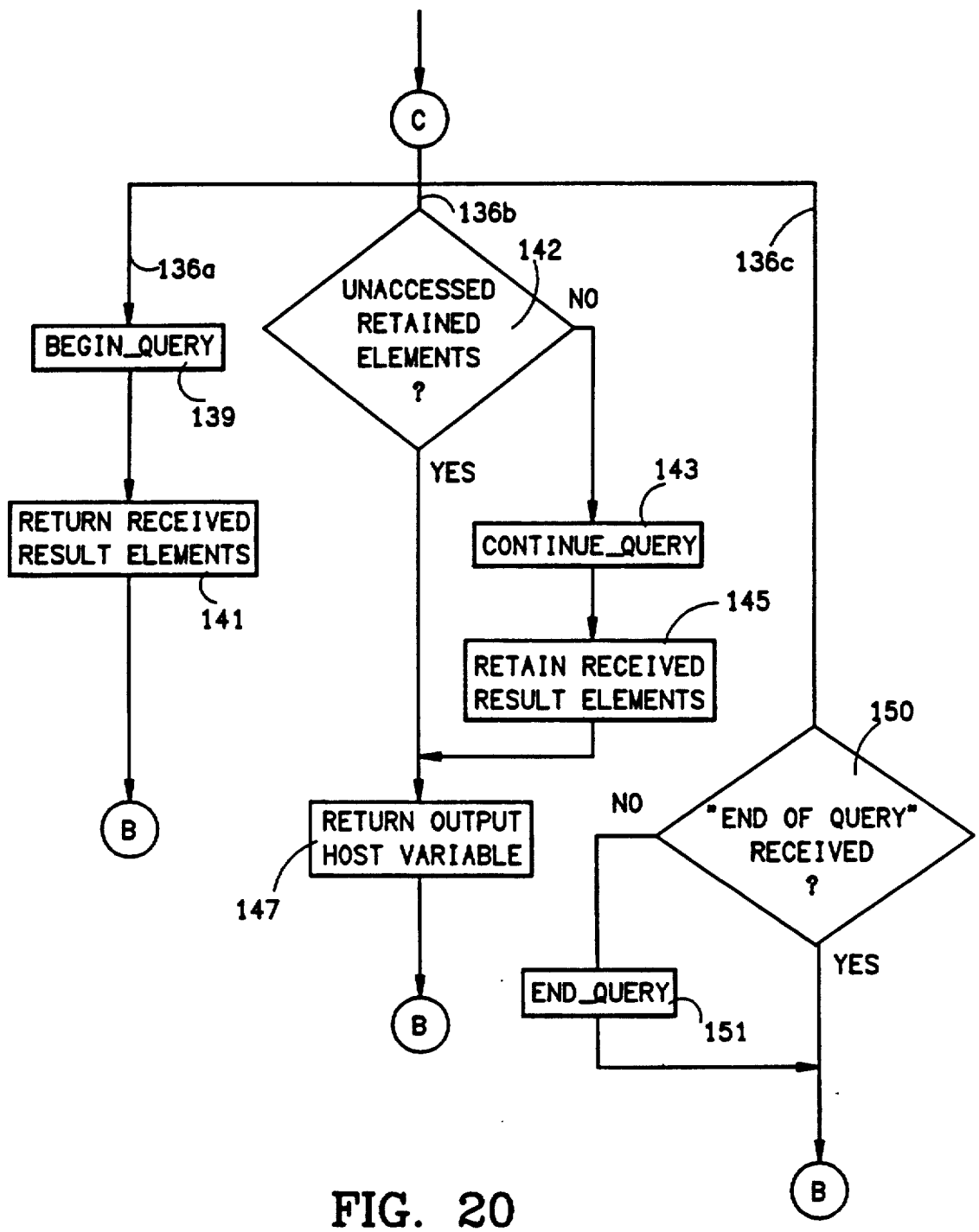

Refer now to FIGS. 18-20 for a summary overview of the method of the invention. In step 100, the invention receives the application program with embedded database language commands. Preprocessor 18 scans the statements of the application program and, in step 102 recognizes and classifies the database language commands in the program. According to the best mode, the Preprocessor 18 classifies database commands into one of five categories, Host Variable declarations, Atomic commands, Set Oriented commands, Dynamic commands, or Transaction commands. In step 104, database language commands which have been recognized and classified are replaced in the application program by statements in the language of the application program. Otherwise, where appropriate, the classified database language commands are replaced with calls to the Database Interface Functions 40, the call referencing parameters including the name of the application program package, the command tag, input and output variables, and other parameters necessary to execution of the replaced command. In step 106, the Preprocessor 18 tags the commands and places them into the Bind file 20.

In step 108, the application program as modified by the Preprocessor 18 is compiled and linked to the Database Interface Functions 40. The position of this step in the procedure illustrated in FIGS. 18 and 19 can be moved to follow the Bind program steps.

The Bind program steps being in step 110 after compilation of the application program with determination of the address of the DBMS named as parameter to the Bind program. In step 112, communication with the named DBMS is established and BEGIN_BIND processing is done during which the name identifying the application program package is communicated to the DBMS. In step 114, the tagged database language commands entered into the Bind file 20 by the Preprocessor 18 are sent one-by-one to the DBMS using a BIND_DATABASE_COMMAND process. When all commands have been sent, END_BIND processing is undertaken in step 116 to terminate the Bind program processing. At this point, the application program is ready to execute and the database commands extracted from it have been sent to the DBMS where they have been retained in the application program's package.

At this point, with reference to FIG. 18, it is worth noting that the process comprising steps 100-108 can be completed at a remote unconnected site, at which time the Bind file 20 and linked application program 14a can be entered into a transportable storage medium such as an optical ROM, magnetic tape, floppy disk, or hard disk and installed in the computer system 10, whereupon the Bind steps 110-116 would be executed using the Application Access Agent of computer 10.

Continuing with the description of the procedure of the invention, the application program begins executing in step 118. The decision 120 is implicit in execution of the program and, for so long as no Database Interface Function call is encountered, the program continues to execute as exemplified by the negative exit from the decision 120 and returned to the decision 120 through the step 121.

When a Database Interface Function call is detected, the method of the program goes to step 124, where, using the name which identifies the application program package, the tag of the replaced database language command, and other command parameters including, but not limited to, input and output Host Variables, the appropriate one of the Database Interface Functions 40 is called. Exit 126 from procedure block 124 corresponds to an Atomic command call for which the corresponding Database Interface Function in step 127 constructs an EXECUTE_ATOMIC_COMMAND message and sends it to the DBMS with the name, tag, and other command parameters necessary for the DBMS to execute the command. Assuming successful execution of the command at the DBMS, the DBMS returns data which the Database Interface Function returns the application program as output Host Variables in step 129. From step 129, the program goes back to point B.

The exit 130 from the program block 124 represents the call corresponding to a Dynamic command for which a PREPARE_COMMAND or EXECUTE_IMMEDIATE message with the appropriate parameters is constructed and sent to the DBMS. Return is made to point B of the program from program step 131.

A Transaction command call is represented by the exit 135. As explained above, the appropriate Database Interface Function sends a message to the DBMS in step 136 requesting execution of a COMMIT or ABORT command. From here the procedure returns to program location B.

Last, the exit 138 represents a call corresponding to a Set Oriented command. As FIG. 20 illustrates, there are three possible branches, corresponding to the three possible Set Oriented Database Interface Functions. Branch 138a represents the initiation of a query by construction of a BEGIN_QUERY message sent to the remote DBMS. Assuming a DBMS indicates acceptance of the message, it will retrieve the bound, tagged command and execute it by beginning a QUERY process. It will send result elements via message to the Database Interface Function 40 as laid out in step 141. From this point, the method returns to B in FIG. 19. The branch 138b represents the flow of result elements to the Database Interface Function which accumulates the element. For elements which have not been accessed by the application program, the positive exit from step 142 is taken and the elements are returned as Output Host Variables in step 147 to the application program. If there are no unaccessed retained variables, the negative exit is taken from the decision 142. The appropriate Database Interface Function 40 constructs a CONTINUE_QUERY message, sends it, together with the appropriate parameters to the the DBMS and retains, in step 145, result elements received from the DBMS. The procedure then, in step 147, returns the elements as Output Host Variables to the application program. The termination of the QUERY is represented by branch 138c which enters the decision 150 to determine whether a "end of query" indication has been received from the DBMS. If so, the Database Interface Function processing is terminated for the query and the method returns to B in FIG. 19. The negative exit from the decision 150 corresponds to the termination of the query on the part of the Database Interface Function 40 by sending an END_QUERY message with the appropriate parameters in step 151.

Figure 21:
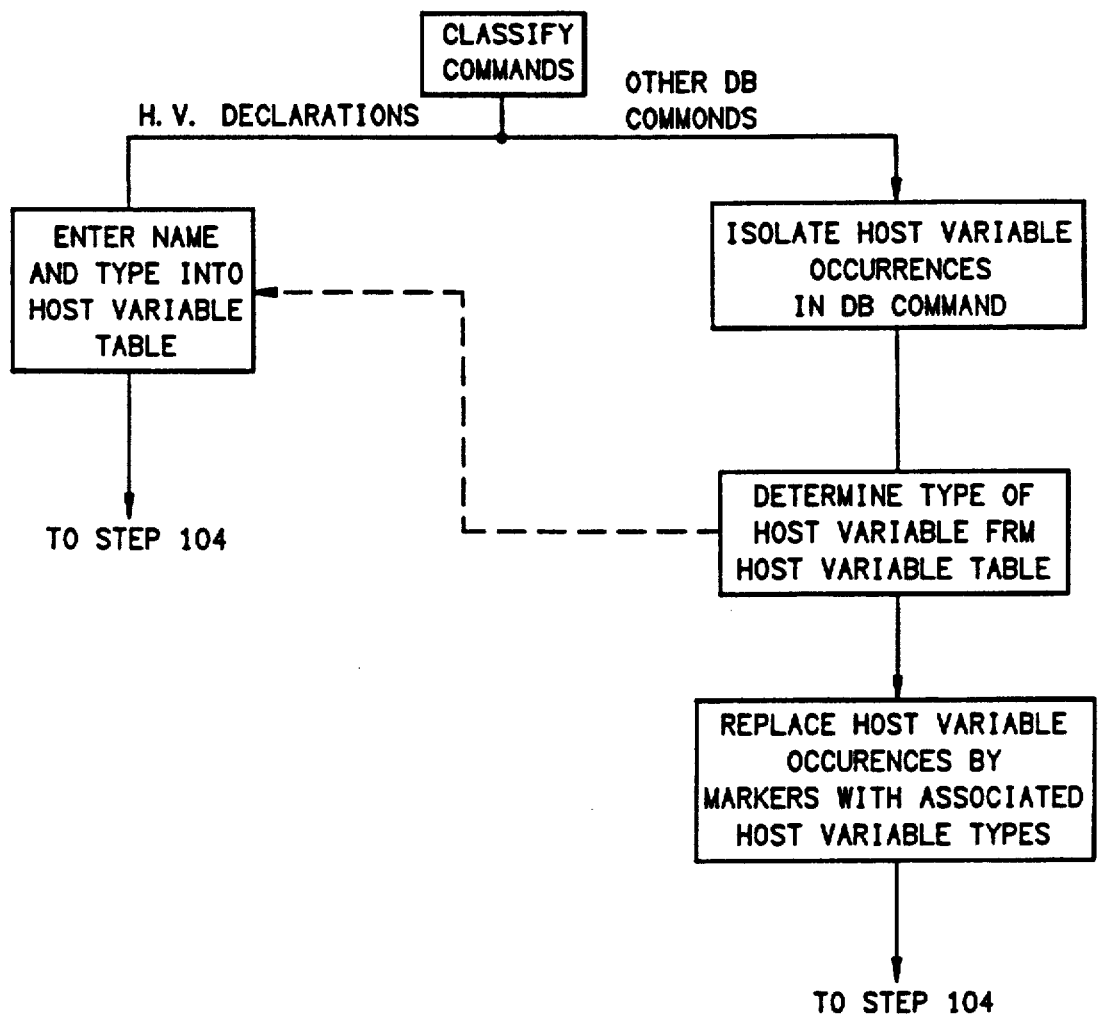
FIG. 21 is a flow diagram illustrating Host Variable processing according to the invention.

In FIG. 21, the Host Variable processing, which is a significant aspect of this invention, is illustrated. This aspect is intrinsic to the Preprocessor steps 102, 104, and 106 in FIG. 18. First, in table 200, every Host Variable declaration command is responded to in step 200 by entering the name and type of declared variable(s) into the Host Variable table 30 (FIG. 1). Now, when commands are placed into the Bind file 20, the Host Variable occurrences in each command are isolated (step 202) their types are determined from the Host Variable table 30 in step 206 and, in step 208, each Host Variable occurrence is replaced by a Host Variable marker with associated Host Variable types. This generic representation accompanies the commands in the Bind file 20 to the DBMS where they are bound. As shown in FIG. 1, each database command in which a Host Variable occurs exhibits, as a replacement, a marker denoting the occurrence and the type. This is shown by the command 62 stored in the package "NAME" 60 in the catalog 63. It is asserted that the DBMS 54 uses the marker to render the Host Variable into a form which is native to the DBMS, thereby supporting execution of the bound command.

It will be appreciated that, although specific embodiments of the invention have been described herein for purposes of illustration, various modifications may be made without departing from the spirit and scope of the invention. Accordingly, the scope of protection of this invention is limited only by the following claims and their equivalents.

We claim:

1. A method for accessing a server database in a database computing system in response to a request by an application program executing in an application computing system which is separate and remote from, and which uses a different language than, the database computing system, wherein a communications facility is connected to the application computing system and to the database computing system and the application computing system, and wherein the application computing system includes access means for providing application programs executing at the application computing system with an interface to the database computing system, the access means including:

preprocessor means for analyzing application programs which are in a first computing language native to the application computing system and which contain database commands in a second computing language native to the database computing system;

bind means for binding database commands at the database computing system to the application computing system; and database interface means for invoking execution of database commands at the database computing system;

the method comprising the steps of:

(a) using the access means at the application computing system, extracting database commands written in the second computing language from the application program, removing said database commands from the application program and inserting into the application program requests in the first computing language for execution of said database commands;

(b) using the bind means at the application computing system, placing the database commands in a bind file and transmitting said database commands in said bind file to the database computing system;

(c) at said database computing system, binding said database commands in said bind file to the application program;

(d) at said application computing system, compiling the application program, linking the application program to the database interface means, and executing the application program;

(e) during execution of the application program, transmitting a request for execution of a database command from the application computing system to the database computing system; and (f) obtaining the database command from the bind file at the database computing system in response to the request for execution; and (g) executing the database command at the database computing system.

2. The method of claim 1, wherein in step (a) the step of replacing comprises the following steps:

identifying host variable references in said first computing language in said database commands;

extracting said host variable references from said database commands; and replacing said host variable reference in said database commands with markers representing said host variable references.

3. In a combination including an application program for execution on a first computer, a database management system for execution on a second computer which is separate and remote from the first computer, and a communications facility linking the first computer and second computer, wherein the first computer is provided with access means for interfacing the application program with the database management system, the access means including:

preprocessor means for analyzing application programs which are written in a first computing language and which contain database commands in a second computing language; binding means for binding database commands in the second computing language to the application program at the second computer; and database interface means for invoking execution of database commands at the second computer;

a method providing the application program with access to a database controlled by the database management system, the method including the steps of:

(a) using the preprocessor means at the first computer, removing database commands written in the second computing language from the application program and replacing said database commands in the application program with requests in the first computing language for execution of the database commands;

(b) using the bind means at the first computer, placing the database commands in a bind file and transmitting the database commands in the bind file from the first computer to the second computer;

(c) binding the database commands in the bind file to the application program in the database management system at the second computer;

(d) at the first computer, compiling the application program and linking the application program to the database interface means;

(e) executing the application program at the first computer and executing the database management system at the second computer;

(f) during execution of the application program and the database management system, transmitting to the database management system a request from the application program for execution of a database command in the bind file; and (g) obtaining the database command from the bind file and executing the database command by the database management system at the second computer in response to the request from the application program.

4. The method of claim 3, further including the steps of:

(h) obtaining results from executing the database command; and (i) returning the results to the application program.

5. The method of claim 4, further including, after once performing a sequence including steps (a)–(d), during step (e) executing steps (f), (g), (h), and (i) without again performing steps (a)–(d).

6. The method of claim 3, further including, after once performing a sequence including steps (a)–(d), during step (e) executing steps (f) and (g) a plurality of times without again performing steps (a)–(d).

7. The method of claim 3, wherein the step of placing database commands includes:

building a bind fine;

generating for the bind file a name identifying the application program; and for each database command in the application program, generating a tag identifying the database command and placing the database command and its identifying tag in the bind file.

8. The method of claim 7, wherein the step of placing database commands further includes the steps of:

identifying host variable references in the database commands;

extracting the host variable references from the database commands; and replacing the host variable references in the database commands with markers representing the host variables, each marker identifying a data type and data structure of a respective host variable reference.

9. The method of claim 3, wherein the step of replacing said database commands includes, for a respective database command including a plurality of host variable references:

generating a tag identifying the database command;

for each host variable reference, producing a host variable marker corresponding to a type of a data structure of the host variable reference' and placing in the application program an invocation of the replaced command, the invocation including the tag and the host variable markers.

10. The method of claim 3, further including:

in the step of removing database commands, classifying database commands into a plurality of predetermined database command classes;

the step of providing a plurality of database interface functions in the database interface means, each database interface function corresponding to a respective database command class, each database interface function including a communication structure for transmitting a database command and accompanying host variable values to the database management system and receiving output host variable values from the database management system; and the step of transmitting a request, for each database command, invoking on the application program a respective database command class including the database command.

11. In a combination including an application program, a database manager, and a facility for providing communications between the application program and the database manager, a method for executing application program database commands at the database manager when the application program executes on a first digital computer and the database manager executes on a second digital computer separate and remote from the first digital computer, the method comprising the steps of:

at the first digital computer, prior to execution of the application program:

providing a preprocessor means for analyzing application programs in a first computing language which include database commands in a database language;

providing bind means for binding database commands in the database language to the application program at the second digital computer; and providing a set of database interface functions each of which corresponds to a respective database command and includes communication means for transmitting a request for execution of the respective database command to the database manager at the second digital computer;

using the preprocessor means, removing database commands from the application program;

using the preprocessor means, replacing the database commands in the application program with corresponding invocations of database interface functions in the first computing language;

using the bind means, accumulating the database commands in a bind file;

using the bind means, transmitting the bind file of database commands from the first digital computer to the database manager at the second digital computer;

at the second digital computer, prior to execution of the application program, binding the bind file to the application program;

compiling and linking the application program at the first digital computer to the database interface means;

executing the application program at the first digital computer;

during execution of the application program:

(a) using the database interface means at the first digital computer, in response to an invocation in the application program, invoking a database interface function corresponding to a database command;

(b) transmitting a request for execution of the database command from the database interface means at the first digital computer to the database manager at the second digital computer; and (c) at the database manager, in response to the request for execution, identifying the database command in the bind file, obtaining the database command from the bind file, and executing the database command at the second digital computer.

12. The method of claim 11, wherein steps (a)–(c) are performed in sequence a plurality of times during the step of executing the application program.

13. A mechanism for supporting remote execution of database language commands in a system including a first computing system for executing application programs in a first computing language which include database language commands in a second computing language and a second computing system for executing said database language commands, the mechanism including:

preprocessing means in the first computing system for:

identifying database language commands in an application program in the first computing language;

extracting said database language commands from the application program;

generating for each database language command removed from the application program a tag which identifies the database language command;

replacing first computing language host variables in database language commands removed from the application program with markers which identify a data format; and replacing database language programs extracted from the application program with invocations, each invocation including a tag identifying a database language command and one or more markers;

bind file means in the first computing system and coupled to the preprocessing means for:

building a bind file with a plurality of file entries, each file entry including a database language command extracted from an application program, together with a tag identifying the database language command and one or more markers corresponding to first computing language host variables removed from the database language command; communicating the bind file to a remote database manager; and binding the file at the remote database manager for execution of data base language commands;

database interface means in the first computing system responsive to an invocation contained in an executing application program for:

passing to a remote database manager executing in the second computing system a tag and one or more markers received in the invocation for execution of the database language command in a bind file at the remote database manager;

receiving from the remote database manager variable values produced at the remote database manager during execution of the database language commands; and passing the variable values to the application program; and means in the first computing system for compiling an application program, linking the application program to the database interface means, and executing the application program; and means in the second computing system for executing the remote database manager.

* * * * *

UNITED STATES PATENT AND TRADEMARK OFFICE
CERTIFICATE OF CORRECTION

PATENT NO. : 5,257,366
DATED : October 26, 1993
INVENTOR(S) : Adair et al

It is certified that error appears in the above-identified patent and that said Letters Patent is hereby corrected as shown below:

Column 31, line 57, please insert --for providing communications between the database computing system-- between "system" and "and".

Column 32, line 40, please change "reference" to --references--.

Column 33, line 41, please change "fine" to --file--.

Signed and Sealed this

Twenty-sixth Day of April, 1994

Attest:

BRUCE LEHMAN

Attesting Officer          Commissioner of Patents and Trademarks